(12) United States Patent
Ferman et al.

(10) Patent No.: US 8,229,248 B2
(45) Date of Patent: Jul. 24, 2012

(54) METHODS AND SYSTEMS FOR IDENTIFYING THE ORIENTATION OF A DIGITAL IMAGE

(75) Inventors: Ahmet Mufit Ferman, Vancouver, WA (US); Richard John Campbell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 13/221,844

(22) Filed: Aug. 30, 2011

(65) Prior Publication Data

US 2011/0311161 A1    Dec. 22, 2011

Related U.S. Application Data

(62) Division of application No. 12/126,514, filed on May 23, 2008, now Pat. No. 8,023,770.

(51) Int. Cl.
*G06K 9/36* (2006.01)
(52) U.S. Cl. ...................................................... 382/290
(58) Field of Classification Search ........... 382/289–291
See application file for complete search history.

(56) References Cited

U.S. PATENT DOCUMENTS

| | | | |
|---|---|---|---|
| 5,020,117 A | 5/1991 | Ooi et al. |
| 5,031,225 A | 7/1991 | Tachikawa et al. |
| 5,054,098 A | 10/1991 | Lee |
| 5,060,276 A | 10/1991 | Morris et al. |
| 5,077,811 A | 12/1991 | Onda |
| 5,101,448 A | 3/1992 | Kawachiya et al. |
| 5,181,260 A | 1/1993 | Kurosu et al. |
| 5,191,438 A | 3/1993 | Katsurada et al. |
| 5,235,651 A | 8/1993 | Nafarieh |
| 5,251,268 A | 10/1993 | Colley et al. |
| 5,276,742 A | 1/1994 | Dasari et al. |
| 5,319,722 A | 6/1994 | Oki et al. |
| 5,471,549 A | 11/1995 | Kurosu et al. |
| 5,508,810 A | 4/1996 | Sato |
| 5,588,072 A | 12/1996 | Wang |
| 5,664,027 A | 9/1997 | Ittner |
| 5,818,978 A | 10/1998 | Al-Hussein |
| 5,835,632 A | 11/1998 | Takasu et al. |
| 5,889,884 A | 3/1999 | Hashimoto et al. |
| 5,930,001 A | 7/1999 | Satoh et al. |
| 5,987,171 A | 11/1999 | Wang |
| 6,011,877 A | 1/2000 | Ishikawa et al. |
| 6,081,616 A | 6/2000 | Vaezi et al. |
| 6,101,270 A | 8/2000 | Takahashi |
| 6,104,832 A | 8/2000 | Saito et al. |

(Continued)

FOREIGN PATENT DOCUMENTS

EP    1073001 A2    1/2001

(Continued)

OTHER PUBLICATIONS

Japanese Office Action—Patent Application No. 2009-123420 (Japanese counterpart to U.S. Appl. No. 12/126,514)—Mailing Date Jan. 25, 2011.

(Continued)

*Primary Examiner* — Jingge Wu
(74) *Attorney, Agent, or Firm* — Kristine Elizabeth Matthews; David C. Ripma

(57) ABSTRACT

Aspects of the present invention are related to systems and methods for determining the orientation of an electronic document image.

13 Claims, 17 Drawing Sheets

U.S. PATENT DOCUMENTS

| | | | |
|---|---|---|---|
| 6,115,497 | A | 9/2000 | Vaezi et al. |
| 6,137,905 | A | 10/2000 | Takaoka |
| 6,151,423 | A | 11/2000 | Melen |
| 6,169,822 | B1 | 1/2001 | Jung |
| 6,173,088 | B1 | 1/2001 | Koh et al. |
| 6,266,441 | B1 | 7/2001 | Hashimoto et al. |
| 6,304,681 | B1 | 10/2001 | Akiba et al. |
| 6,320,983 | B1 | 11/2001 | Matsuno et al. |
| 6,360,028 | B1 | 3/2002 | Kaji et al. |
| 6,411,743 | B1 | 6/2002 | Koh et al. |
| 6,473,517 | B1 * | 10/2002 | Tyan et al. ............ 382/105 |
| 6,501,864 | B1 | 12/2002 | Eguchi et al. |
| 6,512,848 | B2 | 1/2003 | Wang et al. |
| 6,574,375 | B1 | 6/2003 | Cullen et al. |
| 6,624,905 | B1 | 9/2003 | Ikegami et al. |
| 6,798,905 | B1 | 9/2004 | Sugiura et al. |
| 6,804,414 | B1 | 10/2004 | Sakai et al. |
| 6,941,030 | B2 | 9/2005 | Kakutani et al. |
| 6,993,205 | B1 | 1/2006 | Lorie et al. |
| 7,020,338 | B1 * | 3/2006 | Cumbee ............ 382/230 |
| 7,031,553 | B2 | 4/2006 | Myers et al. |
| 7,151,860 | B1 | 12/2006 | Sakai et al. |
| 7,286,718 | B2 | 10/2007 | Aradhye |
| 7,454,045 | B2 * | 11/2008 | Yao et al. ............ 382/128 |
| 7,636,478 | B2 * | 12/2009 | Bryll ............ 382/209 |
| 7,657,120 | B2 | 2/2010 | Aradhye |
| 2001/0013938 | A1 | 8/2001 | Usami et al. |
| 2001/0028737 | A1 | 10/2001 | Takakura et al. |
| 2002/0085755 | A1 | 7/2002 | Chi et al. |
| 2002/0135788 | A1 | 9/2002 | Arakawa et al. |
| 2003/0049062 | A1 | 3/2003 | Machida |
| 2003/0085867 | A1 * | 5/2003 | Grabert ............ 345/156 |
| 2003/0086721 | A1 | 5/2003 | Guillemin et al. |
| 2003/0152289 | A1 | 8/2003 | Luo |
| 2003/0210437 | A1 | 11/2003 | Machida |
| 2004/0001606 | A1 | 1/2004 | Levy |
| 2004/0179733 | A1 | 9/2004 | Okubo |
| 2004/0218836 | A1 | 11/2004 | Kanatsu |
| 2005/0041865 | A1 | 2/2005 | Zhen et al. |
| 2005/0084156 | A1 * | 4/2005 | Das et al. ............ 382/224 |
| 2005/0163399 | A1 | 7/2005 | Aradhye |
| 2006/0018544 | A1 | 1/2006 | Ohguro |
| 2006/0033967 | A1 | 2/2006 | Brunner |
| 2006/0204110 | A1 | 9/2006 | Steinberg et al. |
| 2006/0210195 | A1 | 9/2006 | Ohguro |
| 2006/0215230 | A1 | 9/2006 | Borrey et al. |
| 2006/0245650 | A1 | 11/2006 | Jun et al. |
| 2008/0144971 | A1 | 6/2008 | Wu et al. |
| 2009/0185738 | A1 | 7/2009 | Nepomniachtchi |

FOREIGN PATENT DOCUMENTS

| | | | |
|---|---|---|---|
| GB | 2383223 | A | 6/2003 |
| JP | S57-155673 | A | 9/1982 |
| JP | 10-021336 | A | 1/1998 |
| JP | H11-338974 | A | 12/1999 |

OTHER PUBLICATIONS

U.S. Appl. No. 12/126,561—Notice of Allowance—Dated Jun. 14, 2011.

USPTO Office Action—U.S. Appl. No. 13/212,241—Mailing Date Jan. 18, 2012.

Japanese Office Action—Decision to Grant a Patent—Patent Application No. 2009-123420 (Japanese Counterpart to U.S. Appl. No. 12/126,514)—Mailing Date Jul. 5, 2011.

U.S. Appl. No. 12/126,514—Notice of Allowance—Dated May 16, 2011.

* cited by examiner

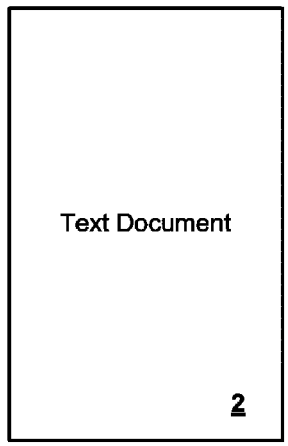
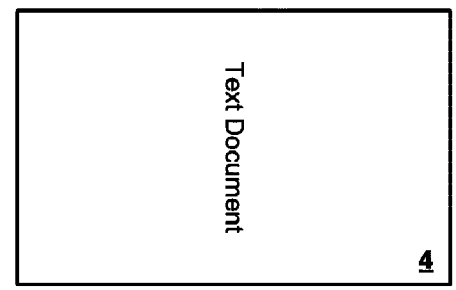
FIG. 1A  FIG. 1B
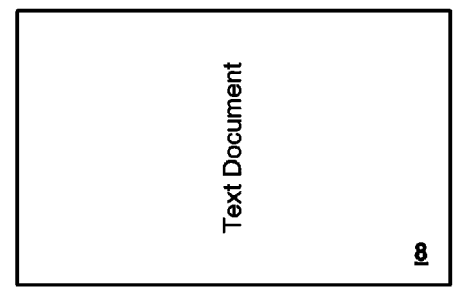
FIG. 1C  FIG. 1D

METHODS AND SYSTEMS FOR IDENTIFYING THE ORIENTATION OF A DIGITAL IMAGE

CROSS REFERENCE TO RELATED APPLICATIONS

This application is a division of U.S. patent application Ser. No. 12/126,514, entitled "Methods and Systems for Identifying the Orientation of a Digital Image," filed on May 23, 2008 now U.S. Pat. No. 8,023,770, invented by Ahmet Mufit Ferman and Richard John Campbell, said application U.S. patent application Ser. No. 12/126,514 is hereby incorporated by reference herein, in its entirety.

FIELD OF THE INVENTION

Embodiments of the present invention comprise methods and systems for determining the orientation of a digital image and, more particularly, for determining the orientation of the digital image by determining the orientation of text within the digital image.

BACKGROUND

Page orientation in an electronic document may not correspond to page orientation in the original document, referred to as the nominal page orientation, due to factors which may comprise scan direction, orientation of the original document on the scanner platen and other factors. The discrepancy between the page orientation in the electronic document and the nominal page orientation may lead to an undesirable, an unexpected, a less than optimal or an otherwise unsatisfactory outcome when processing the electronic document. For example, the difference in orientation may result in an undesirable outcome when a finishing operation is applied to a printed version of the electronic document. Exemplary finishing operations may comprise binding, stapling and other operations. Furthermore, in order to perform at an acceptable level of accuracy, some image processing operations, for example, optical character recognition (OCR), may require specifically oriented input data. Additionally, if the page orientation of an electronic document is unknown relative to the nominal page orientation, proper orientation for display on a viewing device, for example, a computer monitor, a handheld display and other display devices, may not be achieved.

SUMMARY

Some embodiments of the present invention comprise methods and systems for determining the orientation of a document image.

In some embodiments of the present invention, candidate connected-component objects may be matched against numeral templates in the four cardinal directions to estimate the orientation of the document image. In some embodiments of the present invention, the numeral templates may be generated using training data, and the numeral templates may provide a common, size- and font-invariant representation of the numerals.

In some embodiments of the present invention, document components may be size normalized, transformed and matched against the reference numeral templates. Matches may be accumulated, and an orientation estimate may be generated based on the accumulated matches. In some of these embodiments, the numeral templates may be related to size normalized, averaged numeral instances.

In alternative embodiments of the present invention, document components may be size normalized and matched against the numeral templates. Matches may be accumulated, and an orientation estimate may be generated based on the accumulated matches. In some of these embodiments, the numeral templates may be related to size normalized, transformed, averaged numeral instances.

In some embodiments of the present invention, a confidence, or reliability, measure may be determined in association with the orientation estimate.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1A is a drawing showing an exemplary text document in a "readable" orientation;

FIG. 1B is a drawing showing an exemplary text document in an orientation rotated 90 degrees clockwise from the "readable" orientation;

FIG. 1C is a drawing showing an exemplary text document in an orientation rotated 180 degrees clockwise from the "readable" orientation;

FIG. 1D is a drawing showing an exemplary text document in an orientation rotated 90 degrees counter clockwise from the "readable" orientation;

DETAILED DESCRIPTION OF EXEMPLARY EMBODIMENTS

Figure 2:
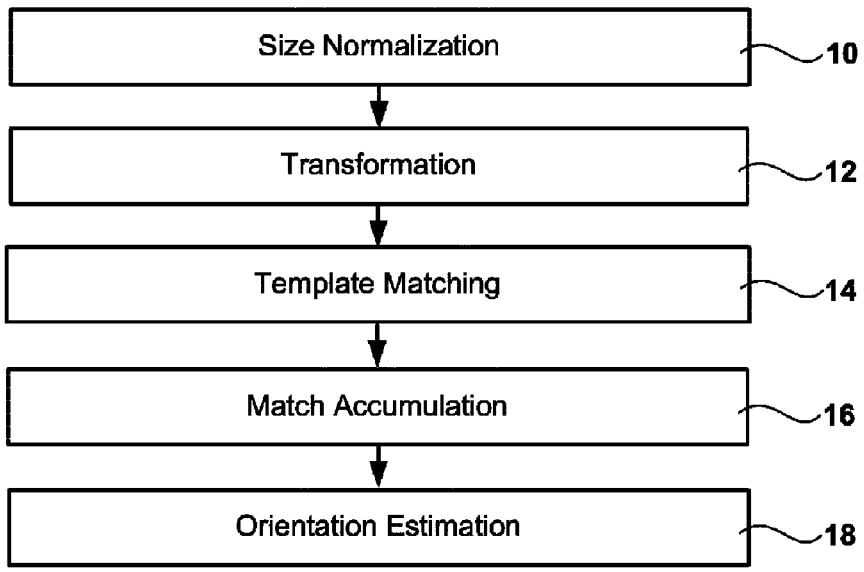
FIG. 2 is a chart showing exemplary embodiments of the present invention comprising document-orientation determination, wherein candidate components are binarized, normalized for size and distance transformed before comparison to numeral templates.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

The page orientation of an electronic document image, also considered a document image, may not correspond to the page orientation of the original document due to factors which may comprise scan direction, orientation of the original document on the scanner platen and other factors. The page orientation of the original document may be referred to as the nominal page orientation or the readable orientation. The discrepancy between the page orientation in the electronic document image and the nominal page orientation may lead to an undesirable, an unexpected, a less than optimal or an otherwise unsatisfactory outcome when processing the electronic document. For example, the difference in orientation may result in an undesirable outcome when a finishing operation is applied to a printed version of the electronic document. Exemplary finishing operations may comprise binding, stapling and other operations. Additionally, in order to perform at an acceptable level of accuracy, some image processing operations, for example, optical character recognition (OCR), may require specifically oriented input data. Moreover, if the page orientation of an electronic document is unknown relative to the nominal page orientation, proper orientation for display on a viewing device, for example, a computer monitor, a handheld display and other display devices, may not be achieved.

Some embodiments of the present invention relate to automatic detection of a dominant text orientation in an electronic document. Text orientation may be related to the nominal page orientation.

During scanning, copying and other digital imaging processes, a document may be placed on the platen or in the document feeder of an imaging device in a non-standard orientation such that the electronic reproduction, also considered the scan, may be flipped or rotated from the normal, reading orientation.

FIGS. 1A-1D depict several document orientations in relation to a readable orientation, also considered the "up" orientation. FIG. 1A shows an exemplary text document 2 in a readable orientation, also considered a 0° orientation. FIG. 1B shows an exemplary text document 4 in a rotated 270° orientation, also considered a rotated clockwise 90° orientation, a rotated counter clockwise 270° orientation, a rotated right 90° orientation and a rotated left 270° orientation. FIG. 1C shows an exemplary text document 6 in a rotated 180° orientation, also considered an inverted orientation. FIG. 1D shows an exemplary text document 8 in a rotated 90° orientation, also considered a rotated clockwise 270° orientation, a rotated counter clockwise 90° orientation, a rotated right 270° orientation and a rotated left 90° orientation.

Rotated electronic pages may require a user to manually correct orientation by physically rotating the original document in the case of a copy or digitally flipping or rotating a page in document viewer or other image or document processing application in the case of a scan.

Some embodiments of the present invention may determine whether an electronic document is in the readable orientation, rotated 90°, rotated 180° or rotated 270°. These four orientations may be referred to as the four cardinal directions.

In some embodiments of the present invention, the orientation of a document image may be determined by comparing connected-component objects against a set of orientation-specific numeral templates. In some of these embodiments, shape similarity may be determined by a distance measure. Template matching results may be accumulated across the entire document image, or a portion of the document image, and the orientation that registers the highest number of matches may be selected as the orientation estimate. A confidence measure, also considered a reliability measure, that reflects the reliability of the orientation estimate may be determined in some embodiments of the present invention. In some of these embodiments, an orientation estimate may be rejected when the confidence measure meets a predefined criterion.

Some embodiments of the present invention may be described in relation to FIG. 2. In these embodiments of the present invention, document components may be size normalized 10, transformed 12 and matched 14 against reference templates. In some embodiments of the present invention, document components may comprise binary, connected components. Matches may be accumulated 16, and an orientation estimate may be generated 18 based on the accumulated matches. In these embodiments of the present invention, the reference templates may comprise orientation-specific numeral templates.

Figure 3:
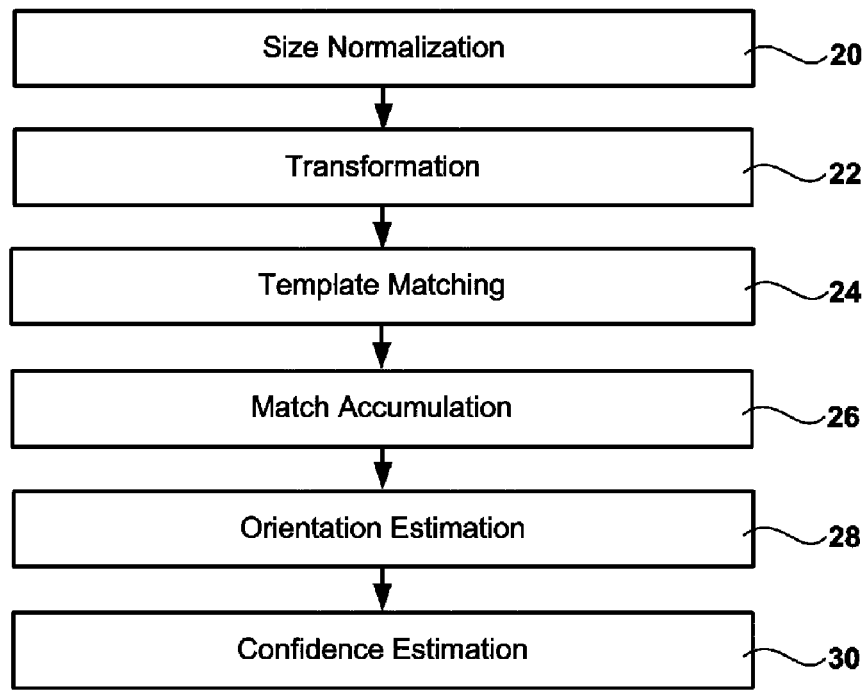
FIG. 3 is a chart showing exemplary embodiments of the present invention comprising determining a confidence value associated with an orientation estimate.

Some embodiments of the present invention may be described in relation to FIG. 3. In these embodiments of the present invention, document components may be size normalized 20, transformed 22 and matched 24 against reference templates. In some embodiments of the present invention, document components may comprise binary, connected components. Matches may be accumulated 26, and an orientation estimate may be generated 28 based on the accumulated matches. In these embodiments, a confidence value indicating the validity of the orientation estimate may be determined 30. In these embodiments of the present invention, the reference templates may comprise orientation-specific numeral templates.

In some embodiments of the present invention, candidate connected-component objects may be matched against numeral templates in the four cardinal directions to estimate the orientation of the document image. The numeral templates may be generated using training data, and the numeral templates may provide a common, size- and font-invariant representation of the numerals.

Figure 4:
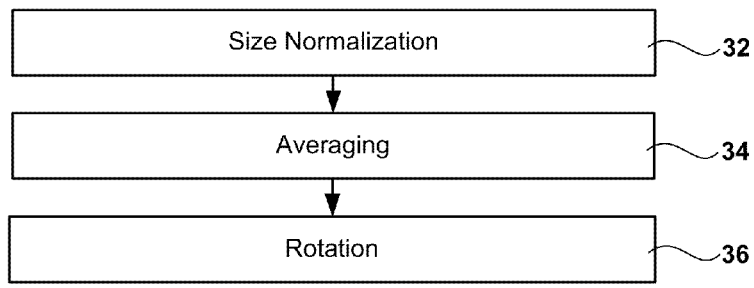
FIG. 4 is chart showing exemplary embodiments of the present invention comprising numeral template generation, wherein numeral templates may be generated from averaging size-normalized, binary, connected components.

In some embodiments of the present invention, the numeral templates may be formed according to FIG. 4. Each sample in a training set corresponding to a numeral may be size normalized 32, and the samples may be averaged 34 together to generate an average representation of the numeral. In some embodiments of the present invention, the binary component sample in the training set may be size normalized 32 to a 32 pixel by 32 pixel grid. In some embodiments of the present invention, rotated templates may be formed 36 from the average representation. In alternative embodiments of the present invention, the training set for a numeral may comprise rotated versions of a numeral, and the template corresponding to a particular orientation may be determined directly.

The training data for template generation may be compiled in a variety of ways. In some embodiments of the present invention, a word processing program may be used to create documents comprising only numeric symbols. For a numeral, a multi-page document containing the numeral in different fonts and font sizes may be created. The pages of each document may be converted to an image format. The image may be binarized and may be analyzed by a connected-component labeling algorithm. The set of connected components, also considered binary maps, may form the training set for the numeral.

In some embodiments of the present invention, each sample in the training set for a numeral may be size normalized to a 32 pixel by 32 pixel block size in order to eliminate the effects of differences in font type and size. The normalized binary maps may be accumulated over the training set to generate an average representation, denoted, $t_n^k$, for the numeral n in the orientation k:

$$t_n^k(i, j) = \frac{1}{N} \sum_{l=1}^{N} bn_l(i, j), n = 1, \ldots, 10, k \in \{0, 90, 180, 270\},$$

where $bn_l(i,j)$ denotes the lth normalized, binary component of a numeral in the training set and N is the total number of training components for the numeral. In some embodiments, the training data may comprise the nth numeral at different orientations k, and $t_n^k$ may be calculated directly.

In alternative embodiments, $t_n^0$ may be determined from the training data corresponding to the readable orientation, and the templates corresponding to the other orientations may be generated by rotating $t_n^0$. In some embodiments of the present invention, templates may be stored for each orientation. In alternative embodiments, templates may be stored for a single orientation.

Figure 5:
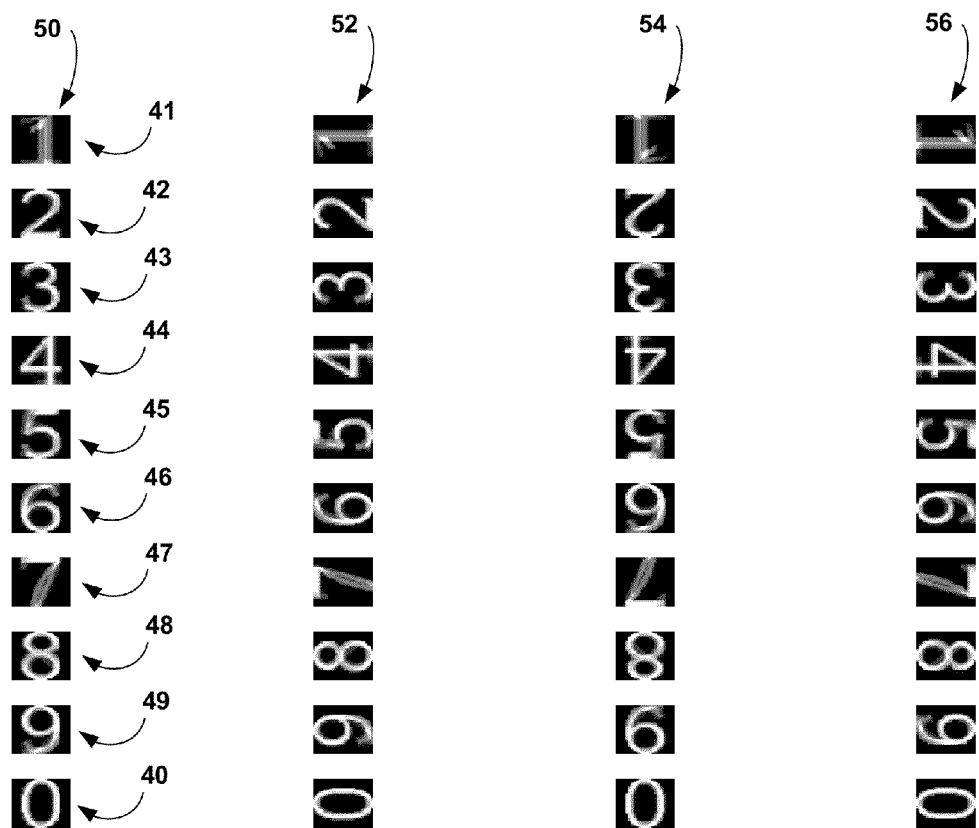
FIG. 5 is a picture depicting exemplary numeral templates for the ten Arabic numerals at the four cardinal orientations.

FIG. 5 depicts exemplary templates 40-49 corresponding to the ten Arabic numerals "0" through "9" at the four cardinal orientations: 0° 50, 90° 52, 180° 54 and 270° 56.

Figure 6:
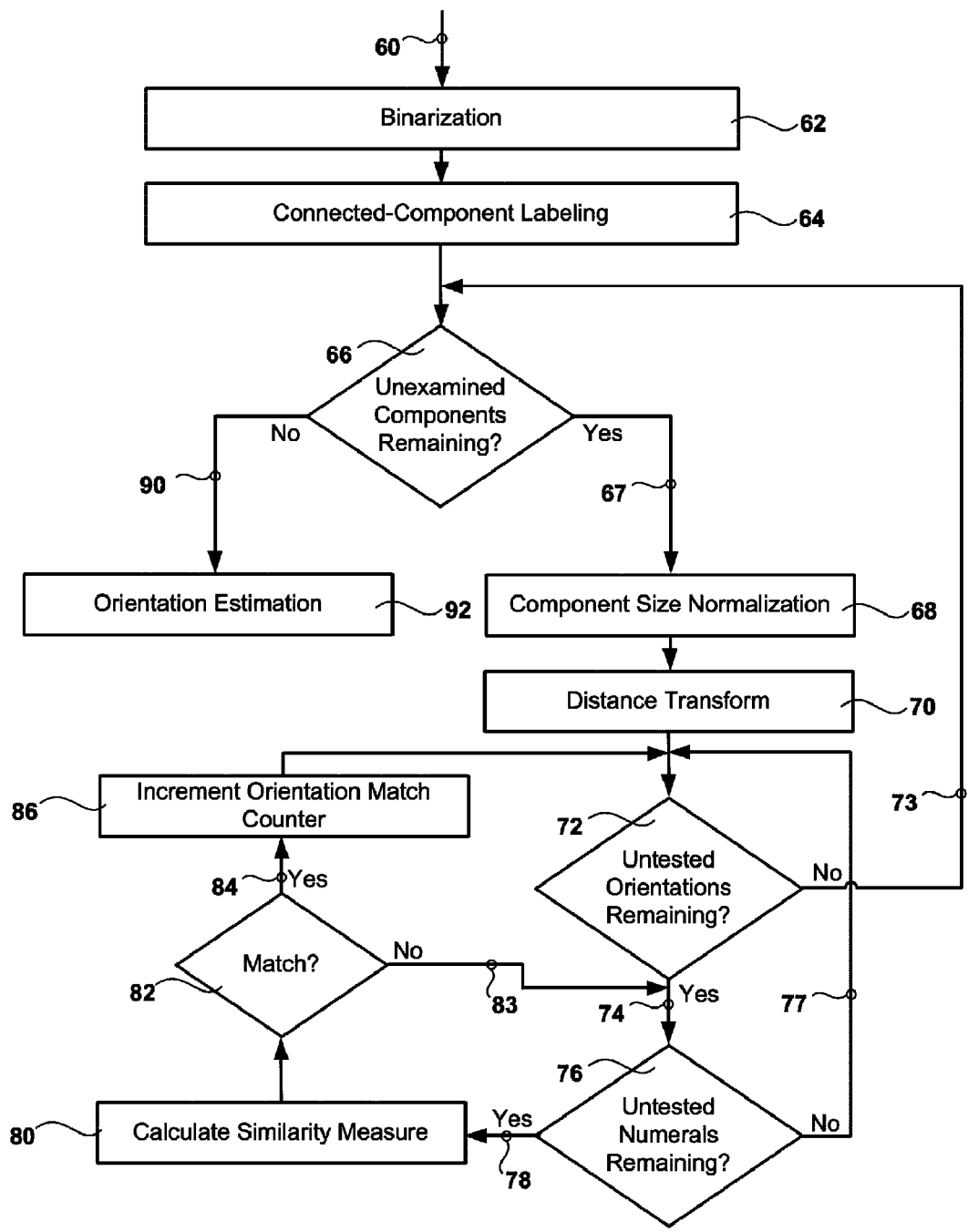
FIG. 6 is a chart showing exemplary embodiments of the present invention comprising comparing a candidate component to numeral templates at an orientation and incrementing a match counter associated with the orientation when at least one comparison at the orientation yields a sufficient match.

Some embodiments of the present invention may be described in relation to FIG. 6. In these embodiments, a document image 60 may be pre-processed prior to an orientation estimation procedure. The pre-processing may include binarization 62 of the document image 60. Connected-component labeling 64 may be performed on the binarized document image.

In some embodiments of the present invention, binarization 62 may comprise thresholding wherein document image pixel values below a threshold value are assigned to one of binary values "0" or "1," and image pixels above, or equal to, the threshold value are assigned to the other binary value. In an exemplary embodiment, thresholding a document image with white background and black text may yield a binary mask image wherein all text pixels are represented with "1"s, and all non-text pixels are represented with "0"s. Individual pixels that are connected through common neighbors may be grouped into single entities in the connected component labeling 64 process. The connected components may correspond to non-background content in the document image. Exemplary non-background content may comprise text, picture regions, line art, local background regions and other non-background content. In some embodiments of the present invention, each connected component may be represented by the minimum bounding box that contains all of the non-background pixels of the connected component. In some embodiments of the present invention, component properties may be computed to eliminate non-text connected components.

Connected-component candidates may be examined 66. If there are connected components remaining to examine 67, the next connected component may be examined. The component may be size normalized 68, and a distance transform may be applied 70 to the normalized, binary component. In some embodiments of the present invention, the binary connected component may be size normalized to a 32 pixel by 32 pixel grid. In some embodiments of the present invention, the distance transform may comprise assigning a value of "0" to those pixels that are part of the component symbol. The background pixels in the component may be assigned a value related to the distance to the nearest pixel that is part of the component symbol. Exemplary distance measures may comprise an $L_1$ norm, an $L_2$ norm, a city block distance measure, a Euclidean distance measure, a weighted city block distance measure and other well-known-in-the-art distance measures. In some embodiments of the present invention, the grassfire transform may be implemented to provide a city block distance representation.

In alternative embodiments of the present invention, normalization and distance transformation may be performed on all candidate connected components prior to determining if a candidate has been examined.

The distance-transformed component may be compared to numeral templates at each of the four cardinal orientations. It may first be determined 72 if all orientations have been tested. If all orientations have been tested 73, then the next component may be examined 66. If there are remaining orientations to test 74, it may be determined 76 if there are remaining numeral templates to be tested. If there are no remaining numeral templates to be tested at an orientation 77, then the next orientation may be examined 72. If there are remaining numeral templates to test 78, then a similarity measure may be calculated 80 between the distance-transformed component and the numeral template at the orientation under examination.

In some embodiments of the present invention, the similarity, denoted $s_k(m,n)$ between a component, $c_m$, and a template $t_n^k$, wherein the subscript n refers to the numeral and the superscript k refers to the orientation, may be calculated 80 according to:

$$s_k(m, n) = \sum_{i=1}^{I} \sum_{j=1}^{J} c_m(i, j) t_n^k(i, j),$$

where the normalized size of a component and a template is I pixels by J pixels. In some embodiments of the present invention, I=32 and J=32.

In some embodiments of the present invention, wherein the distance transform comprises assigning a value of "0" to those pixels that are part of the component symbol and assigning background pixels in the component a value related to the distance to the nearest pixel that is part of the component symbol, a low value of $s_k(m,n)$ indicates a good match between component $c_m$ and template $t_n^k$.

The quality of the match may be examined 82, and if the match is 84 sufficiently good, then an orientation match counter corresponding to the orientation under examination may be incremented 86 and the next, unexamined orientation may be considered 72. If the match is not 83 considered sufficiently good, then the next, unexamined numeral may be considered 76.

In some embodiments of the present invention, wherein a low value of $s_k(m,n)$ indicates a good match between component $c_m$ and template $t_n^k$, a template may be considered a match to a component when $s_k(m,n) \leq T_{match}$. In alternative embodiments of the present invention, wherein a low value of $s_k(m,n)$ indicates a good match between component $c_m$ and template $t_n^k$, a template may be considered a match to a component when $s_k(m,n) < T_{match}$.

In some embodiments of the present invention, wherein a large value of $s_k(m,n)$ indicates a good match between component $c_m$ and template $t_n^k$, a template may be considered a match to a component when $s_k(m,n) \geq T_{match}$. In alternative embodiments of the present invention, wherein a large value of $s_k(m,n)$ indicates a good match between component $c_m$ and template $t_n^k$, a template may be considered a match to a component when $s_k(m,n) > T_{match}$.

When there are no unexamined components remaining 90, an orientation estimate may be determined 92. In some embodiments of the present invention, the orientation corresponding to the largest-valued match counter may be selected as the orientation estimate for the document image 60.

Figure 7:
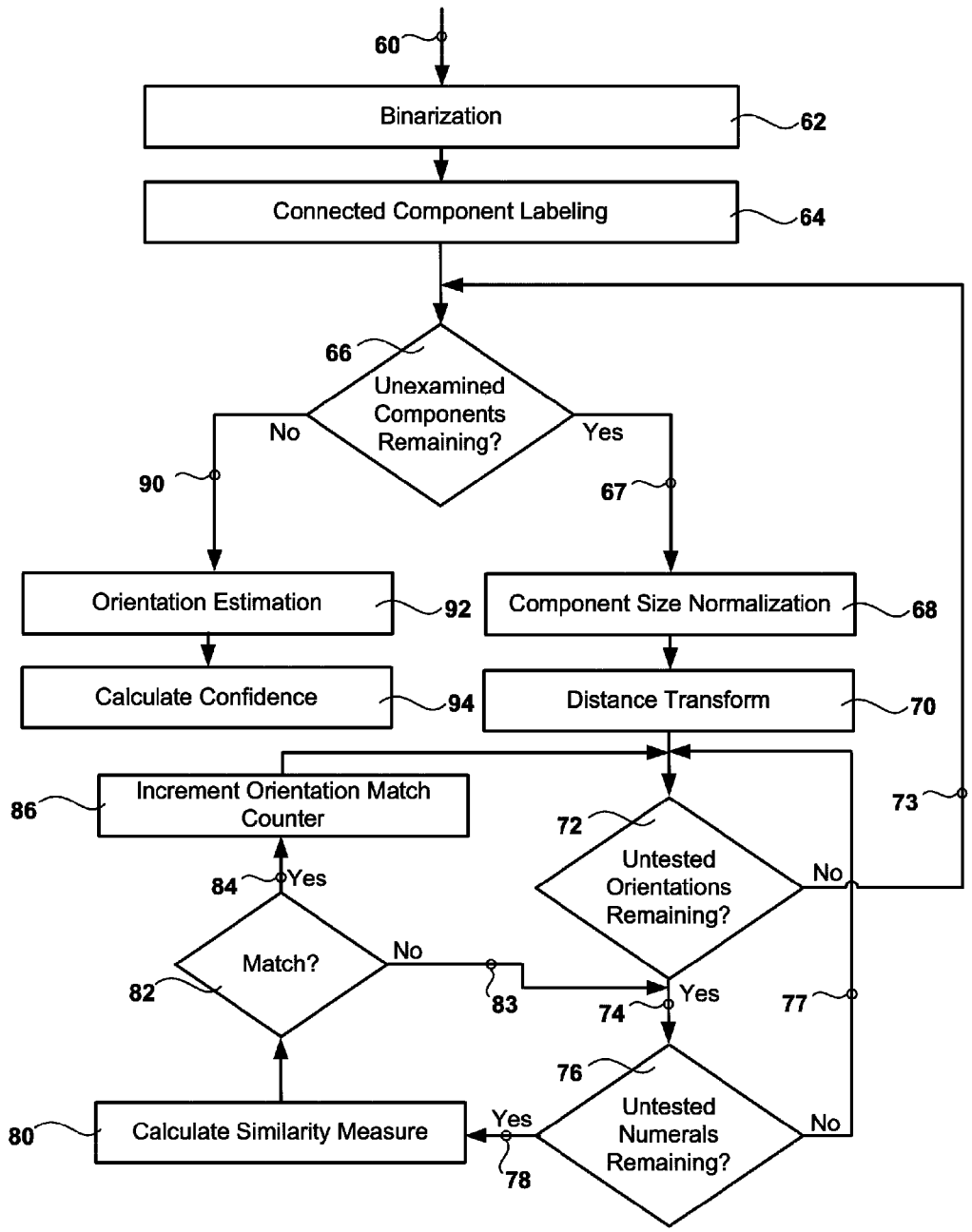
FIG. 7 is a chart showing exemplary embodiments of the present invention comprising generating a confidence value associated with an orientation estimate determined according to embodiments of the present invention shown in FIG. 6.

In some embodiments of the present invention shown in FIG. 7, after an orientation estimate is determined 92, a confidence, also considered reliability, measure related to the estimate may be determined 94.

Figure 8:
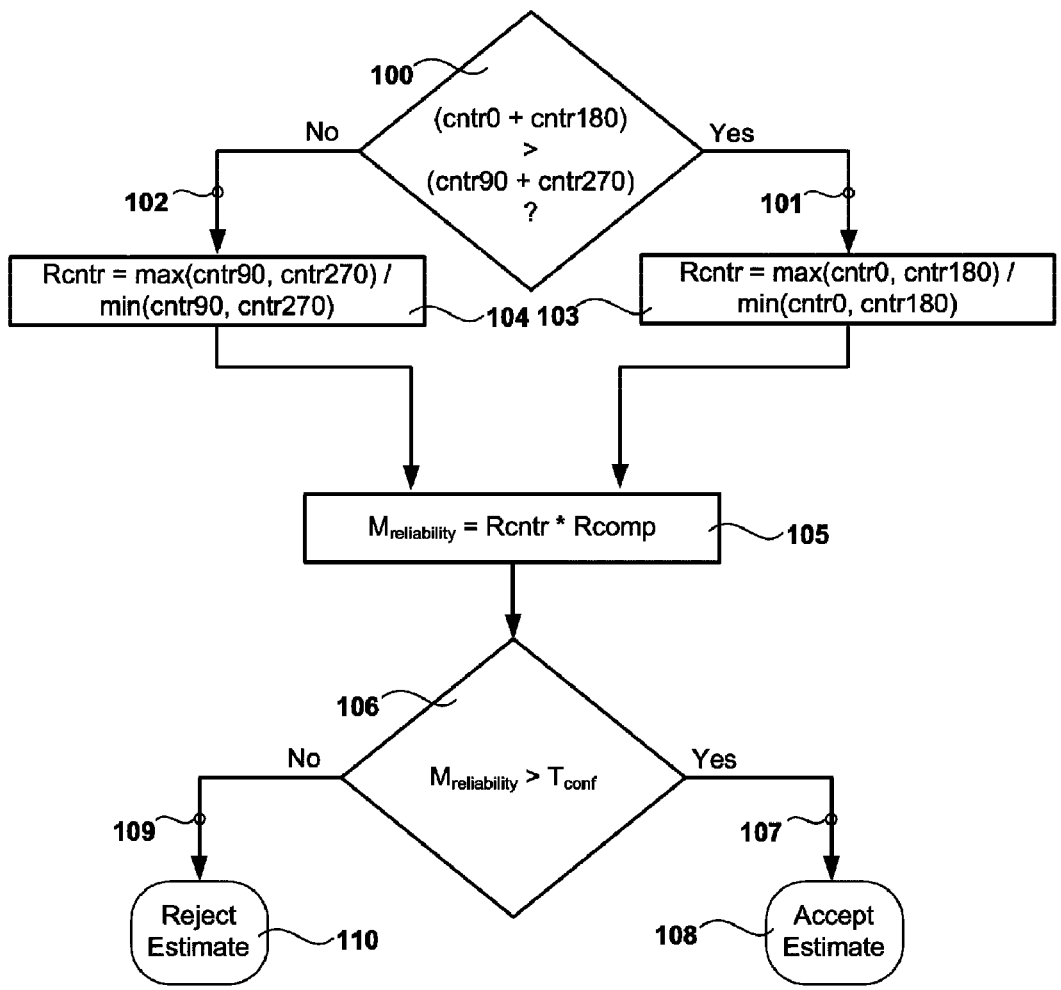
FIG. 8 is a chart showing exemplary embodiments of the present invention, wherein a confidence value may be determined based on the ratio of orientation-pair match counts.

In some embodiments of the present invention, the match counters corresponding to each orientation may be analyzed to determine 94 the reliability of the numeral-based orientation estimate. In some of these embodiments, described in relation to FIG. 8, the match counters may be analyzed to determine which orientation pair (90° and 270° vs. 0° and 180°) registers the largest value 100. This analysis may determine whether the document is rotated by ±90° 102 or is in the upright/flipped orientation 101. The ratio of the larger value to the smaller value in the selected pair may be computed.

If the orientation pair 0° and 180° registers a larger value than the orientation pair 90° and 270° 101, then the ratio, which may be denoted Rcntr, may be determined 103 according to:

$$Rcntr = \frac{\max(cntr0, cntr180)}{\min(cntr0, cntr180)},$$

where cntr0 is the value of the match counter corresponding to the 0° orientation, and cntr180 is the value of the match counter corresponding to the 180° orientation.

If the orientation pair 90° and 270° registers a larger value than the orientation pair 0° and 180° 102, then the ratio, which may be denoted Rcntr, may be determined 104 according to:

$$Rcntr = \frac{\max(cntr90, cntr270)}{\min(cntr90, cntr270)},$$

where cntr90 is the value of the match counter corresponding to the 90° orientation, and cntr270 is the value of the match counter corresponding to the 270° orientation.

The ratio, Rcntr, may be multiplied 105 by the ratio, which may be denoted Rcomp, of the number of candidate numerals to the total number of candidate text components in the document image. Note that Rcomp is equal to "1" if no filtering is performed on the results of connected-component labeling to eliminate likely non-numeral symbols. The resulting measure, which may be denoted $M_{reliability}$, may represent the confidence value of the orientation estimate for the input document. In some embodiments of the present invention, the confidence value may be compared 106 to a threshold value, which may be denoted $T_{conf}$. The orientation estimate may be considered reliable 108 when the confidence measure, $M_{reliability}$, is greater than 107 the threshold value, $T_{conf}$. The orientation estimate may be deemed unreliable and thus rejected 110 when the confidence measure, $M_{reliability}$, is not greater than 109 the threshold value, $T_{conf}$. In some embodiments of the present invention, the value of $T_{conf}$ may be 0.6.

In some embodiments of the present invention, the validity of the orientation estimate may be based on the maximum value of the match counters. In some of these embodiments, the maximum match counter value must exceed a pre-determined threshold, which may be denoted $T_{MaxVal}$, for the estimate to be accepted. If this condition is not satisfied, then the numeral-based orientation estimate may be deemed unreliable and not used.

In some embodiments of the present invention, both conditions related to $T_{conf}$ and $T_{MaxVal}$ must be satisfied in order for an orientation estimate to be deemed reliable. In alternative embodiments of the present invention, if one of the conditions for reliability is not satisfied, then the orientation estimate may be deemed unreliable. In some embodiments of the present invention, only one of these conditions may be tested.

In some embodiments of the present invention, the value of $T_{MaxVal}$ may be set to 25.

Figure 9:
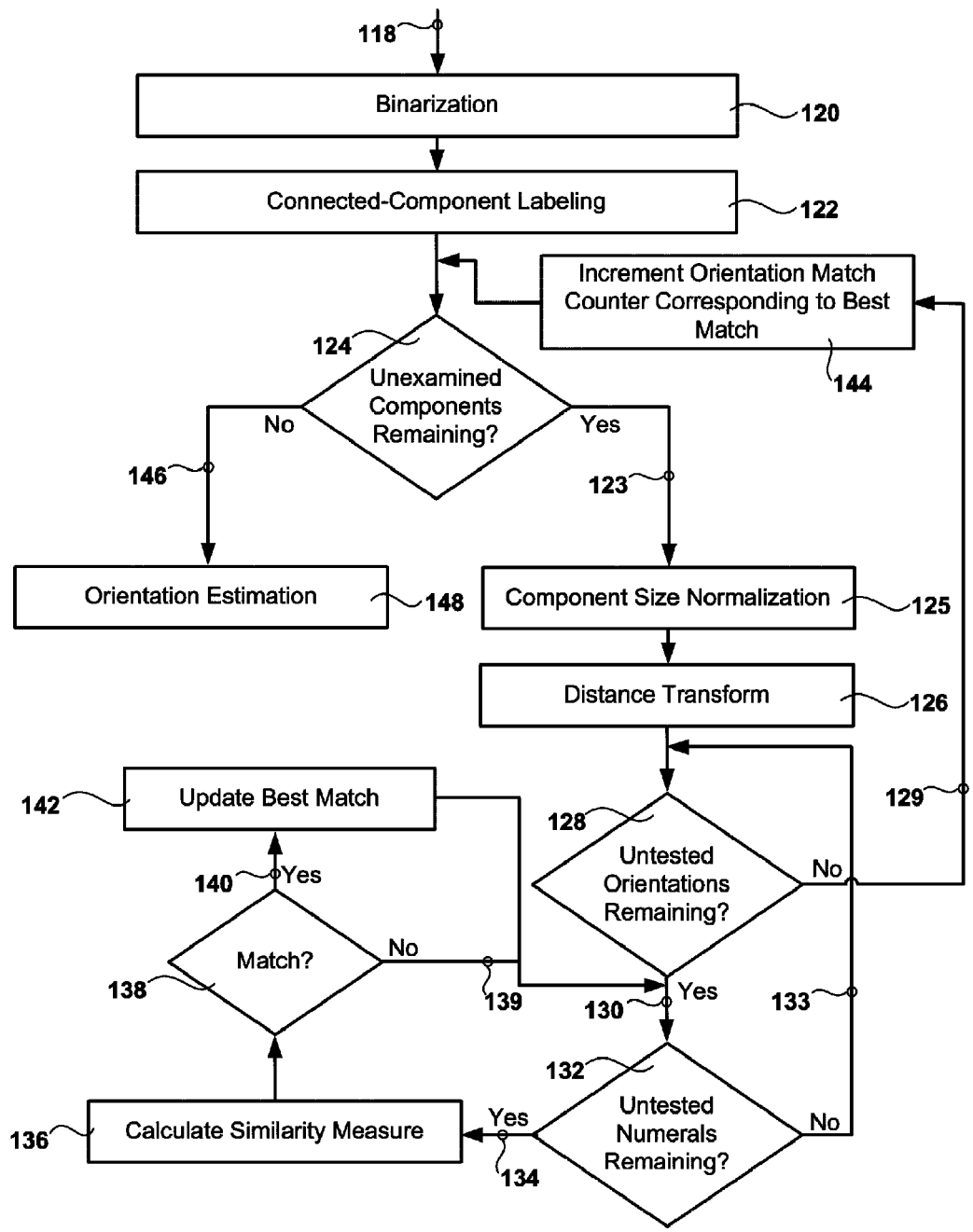
FIG. 9 is a chart showing exemplary embodiments of the present invention comprising comparing a candidate component to numeral templates at a plurality of orientations and incrementing a match counter associated with the orientation for which the best match is obtained when the best match meets a match criterion.

In some embodiments of the present invention described in relation to FIG. 5 and FIG. 6, the match counter corresponding to an orientation may be incremented when at least one template associated with the orientation is sufficiently similar to the candidate component. In alternative embodiments of the present invention, a match counter corresponding to an orientation may be incremented only when a template associated with the orientation yields the best match of all templates at all orientations. Some of these embodiments may be described in relation to FIG. 9.

In these embodiments, a document image 118 may be pre-processed prior to an orientation estimation procedure. The pre-processing may include binarization 120 of the document image 118. Connected-component labeling 122 may be performed on the binarized document image.

In some embodiments of the present invention, binarization 120 may comprise thresholding wherein image pixel values below a threshold value are assigned to one of binary values "0" or "1," and image pixels above, or equal to, the threshold value are assigned to the other binary value. In an exemplary embodiment, thresholding a document image with white background and black test may yield a binary mask image wherein all text pixels are represented with "1"s, and all non-text pixels are represented with "0"s. Individual pixels that are connected through common neighbors may be grouped into single entities in the connected component labeling 122 process. The connected components may correspond to non-background content in the document image. Exemplary non-background content may comprise text, picture regions, line art, local background regions and other non-background content. In some embodiments of the present invention, each connected component may be represented by the minimum bounding box that contains all of the non-background pixels of the connected component. In some embodiments of the present invention, component properties may be computed to eliminate non-text connected components.

Connected-component candidates may be examined 124. If there are connected components remaining to examine 123, the next connected component may be examined. The component may be size normalized 125, and a distance transform may be applied 126 to the normalized, binary component. In some embodiments of the present invention, the binary connected component may be size normalized to a 32 pixel by 32 pixel grid. In some embodiments of the present invention, the distance transform may comprise assigning a value of "0" to those pixels that are part of the component symbol. The background pixels in the component may be assigned a value related to the distance to the nearest pixel that is part of the component symbol. Exemplary distance measures may comprise an $L_1$ norm, an $L_2$ norm, a city block distance measure, a Euclidean distance measure, a weighted city block distance measure and other well-known-in-the-art distance measures.

In some embodiments of the present invention, the grassfire transform may be implemented to provide a city block distance representation.

In alternative embodiments of the present invention, normalization and distance transformation may be performed on all candidate connected components prior to determining if a candidate has been examined.

The distance-transformed component may be compared to numeral templates at each of the four cardinal orientations. It may first be determined 128 if all orientations have been tested. If all orientations have been tested 129, then an orientation match counter corresponding to the orientation for which the best match between the component and a template was obtained may be incremented 144. Then the next component may be examined 124.

If there are remaining orientations to test 130, it may be determined 132 if there are remaining numeral templates to be tested. If there are no remaining numeral templates to be tested at an orientation 133, then the next orientation may be examined 128. If there are remaining numeral templates to test 134, then a similarity measure may be calculated 136 between the distance-transformed component and the numeral template at the orientation under examination.

In some embodiments of the present invention, the similarity, denoted $s_k(m,n)$ between a component, $c_m$, and a template $t_n^k$, where the subscript n refers to the numeral and the superscript k refers to the orientation, may be calculated 136 according to:

$$s_k(m, n) = \sum_{i=1}^{I} \sum_{j=1}^{J} c_m(i, j) t_n^k(i, j),$$

where the normalized size of a component and a template is I pixels by J pixels. In some embodiments of the present invention, I=32 and J=32.

In some embodiments of the present invention, wherein the distance transform comprises assigning a value of "0" to those pixels that are part of the component symbol and assigning background pixels in the component a value related to the distance to the nearest pixel that is part of the component symbol, a low value of $s_k(m,n)$ indicates a good match between component $c_m$ and template $t_n^k$.

The quality of the match may be examined 138, and if the match is 140 sufficiently good, then a best match indicator may be updated 142 if the current match is a better match than the previously recorded best match. The next, unexamined numeral may be considered 132. If the match is not 139 considered sufficiently good, then the next, unexamined numeral may be considered 132.

In some embodiments of the present invention, wherein a low value of $s_k(m,n)$ indicates a good match between component $c_m$ and template $t_n^k$, a template may be considered a match to a component when $s_k(m,n) \leq T_{match}$. In alternative embodiments of the present invention, wherein a low value of $s_k(m,n)$ indicates a good match between component $c_m$ and template $t_n^k$, a template may be considered a match to a component when $s_k(m,n) < T_{match}$.

In some embodiments of the present invention, wherein a large value of $s_k(m,n)$ indicates a good match between component $c_m$ and template $t_n^k$, a template may be considered a match to a component when $s_k(m,n) \geq T_{match}$. In alternative embodiments of the present invention, wherein a large value of $s_k(m,n)$ indicates a good match between component $c_m$ and template $t_n^k$, a template may be considered a match to a component when $s_k(m,n) > T_{match}$.

When there are no unexamined components remaining 146, an orientation estimate may be determined 148. In some embodiments of the present invention, the orientation corresponding to the largest-valued match counter may be selected as the orientation estimate for the document image 118.

In alternative embodiments of the present invention, all matches and associated orientations may be recorded upon occurrence, and the best match may be determined after all templates have been examined.

Figure 10:
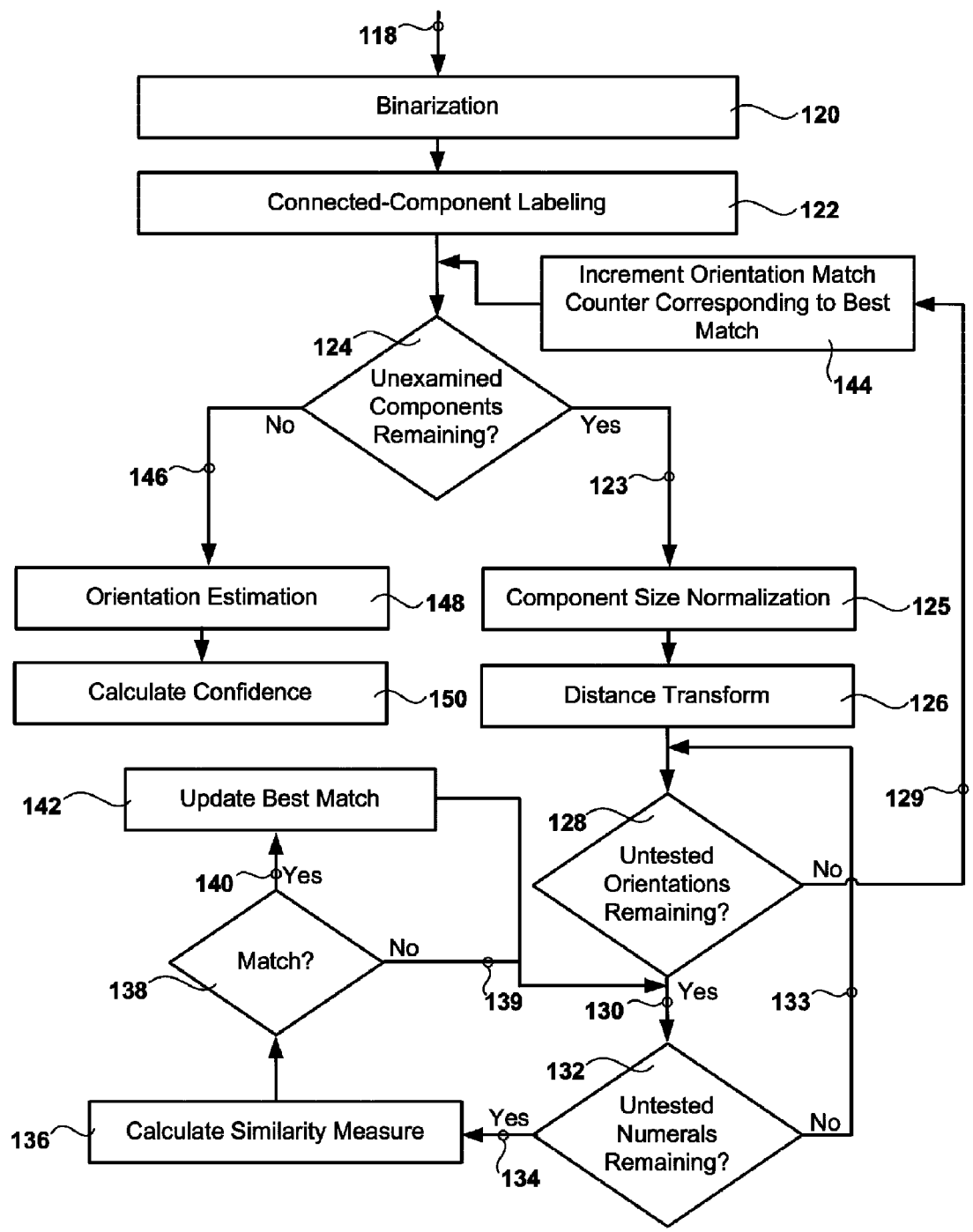
FIG. 10 is a chart showing exemplary embodiments of the present invention comprising generating a confidence value associated with an orientation estimate determined according to embodiments of the present invention shown in FIG. 9.

In some embodiments of the present invention shown in FIG. 10, after an orientation estimate is determined 148, a confidence, also considered reliability, measure related to the estimate may be determined 150.

In some embodiments of the present invention, the confidence measure may be determined 150 as previously described.

In some embodiments of the present invention, candidate connected-component objects may be matched against numeral templates in the four cardinal directions to estimate the orientation of the document image. The numeral templates may be generated using training data, and the numeral templates may provide a common, size- and font-invariant representation of the numerals.

Figure 11:
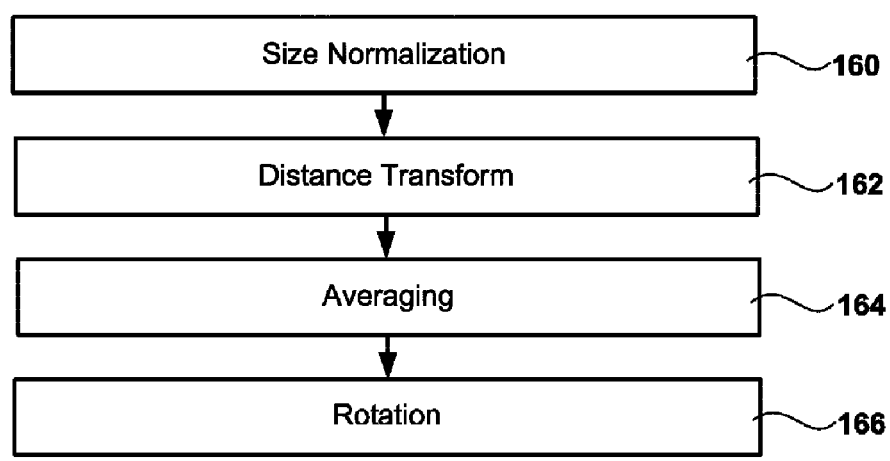
FIG. 11 is chart showing exemplary embodiments of the present invention comprising numeral template generation, wherein numeral templates may be generated by size normalization, distance transformation and averaging of binary, connected components.

In alternative embodiments of the present invention, the numeral templates may be formed according to FIG. 11. Each binary component sample in a training set corresponding to a numeral may be size normalized 160, and the normalized numerals may be distance transformed 162. The distance transformed samples may be averaged 164 together to generate an average representation of the numeral. In some embodiments of the present invention, rotated templates may be formed 166 from the average representation. In alternative embodiments of the present invention, the training set for a numeral may comprise rotated versions of a numeral, and the template corresponding to a particular orientation may be determined directly.

In some embodiments of the present invention, the binary component sample in the training set may be size normalized to a 32 pixel by 32 pixel grid. In some embodiments of the present invention, the distance transform may comprise assigning a value of "0" to those pixels that are part of the component symbol. The background pixels in the component may be assigned a value related to the distance to the nearest pixel that is part of the component symbol. Exemplary distance measures may comprise an $L_1$ norm, an $L_2$ norm, a city block distance measure, a Euclidean distance measure, a weighted city block distance measure and other well-known-in-the-art distance measures. In some embodiments of the present invention, the grassfire transform may be implemented to provide a city block distance representation.

Figure 12:
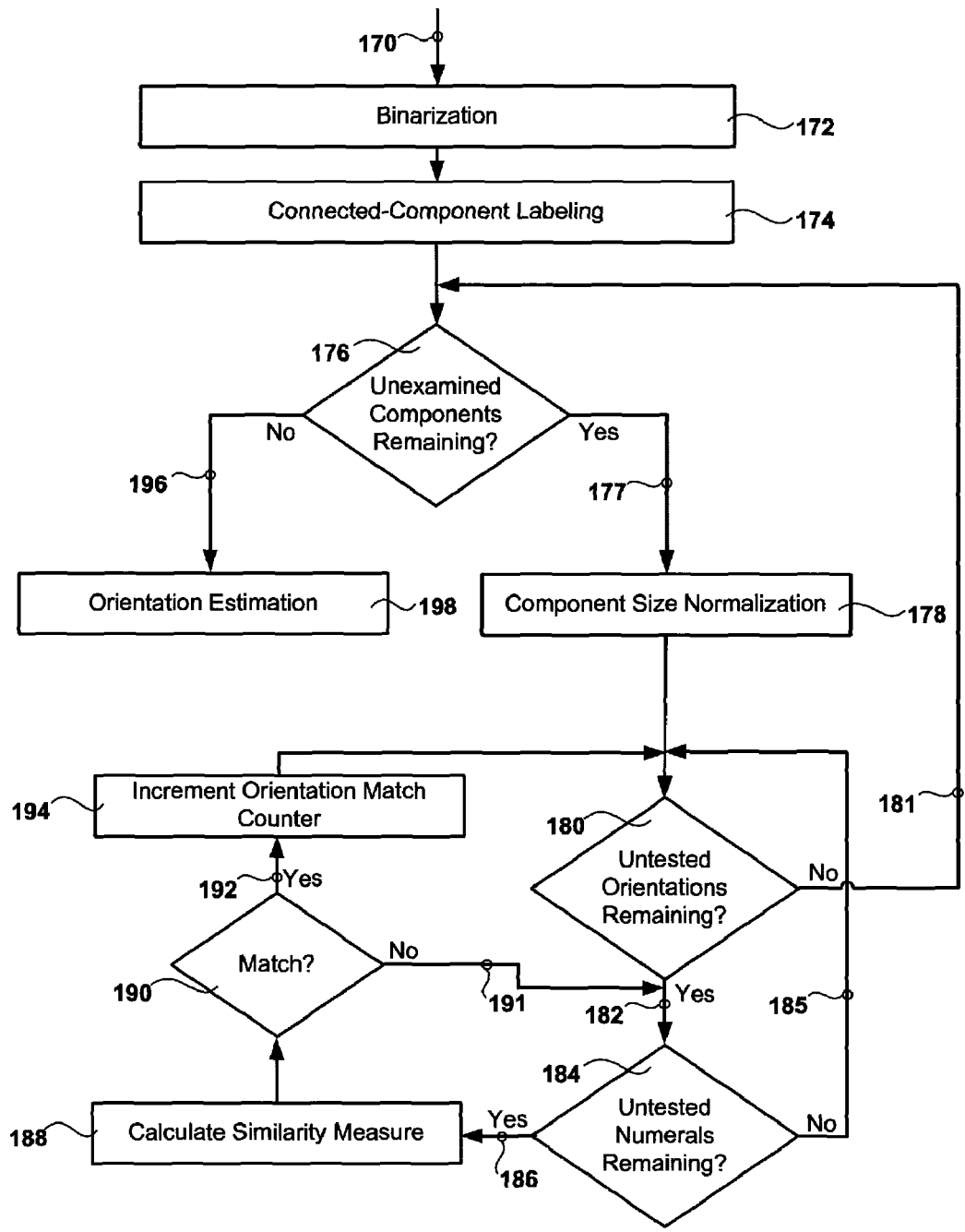
FIG. 12 is a chart showing exemplary embodiments of the present invention comprising comparing a candidate component to numeral templates at an orientation and incrementing a match counter associated with the orientation when at least one comparison at the orientation yields a sufficient match.

Some embodiments of the present invention may be described in relation to FIG. 12. In these embodiments, a document image 170 may be pre-processed prior to an orientation estimation procedure. The pre-processing may include binarization 172 of the document image 170. Connected-component labeling 174 may be performed on the binarized document image.

In some embodiments of the present invention, binarization 172 may comprise thresholding wherein image pixel values below a threshold value are assigned to one of binary values "0" or "1," and image pixels above, or equal to, the threshold value are assigned to the other binary value. In an exemplary embodiment, thresholding a document image with white background and black test may yield a binary mask image wherein all text pixels are represented with "1"s, and all non-text pixels are represented with "0"s. Individual pixels that are connected through common neighbors may be grouped into single entities in the connected component labeling 174 process. The connected components may correspond to non-background content in the document image. Exemplary non-background content may comprise text, picture regions, line art, local background regions and other non-background content. In some embodiments of the present invention, each connected component may be represented by the minimum bounding box that contains all of the non-background pixels of the connected component. In some embodiments of the present invention, component properties may be computed to eliminate non-text connected components.

Connected-component candidates may be examined 176. If there are connected components remaining to examine 177, the next connected component may be examined. The component may be size normalized 178 forming a binary, normalized component. In some embodiments of the present invention, the binary connected component may be size normalized to a 32 pixel by 32 pixel grid.

In alternative embodiments of the present invention, normalization may be performed on all candidate connected components prior to determining if a candidate has been examined.

The binary, normalized component may be compared to numeral templates at each of the four cardinal orientations. It may first be determined 180 if all orientations have been tested. If all orientations have been tested 181, then the next component may be examined 176. If there are remaining orientations to test 182, it may be determined 184 if there are remaining numeral templates to be tested. If there are no remaining numeral templates to be tested at an orientation 185, then the next orientation may be examined 180. If there are remaining numeral templates to test 186, then a similarity measure may be calculated 188 between the normalized, binary component and the numeral template at the orientation under examination.

In some embodiments of the present invention, the similarity, denoted $s_k(m,n)$ between a component, $c_m$, and a template $g_n^k$, where the subscript n refers to the numeral and the superscript k refers to the orientation, may be calculated 188 according to:

$$s_k(m, n) = \sum_{i=1}^{I} \sum_{j=1}^{J} c_m(i, j) g_n^k(i, j),$$

where the normalized size of a component and a template is I pixels by J pixels. In some embodiments of the present invention, I=32 and J=32.

In these embodiments of the present invention, wherein the templates comprise distance-transformed numerals and the candidate components comprise normalized, binary components, the similarity may be calculated 188 according to:

$$s_k(m, n) = \sum_{i=1}^{I} \sum_{j=1}^{J} \begin{cases} g_n^k(i, j), & \text{if } c_m(i, j) = 1 \\ 0, & \text{otherwise} \end{cases}.$$

In some embodiments of the present invention, wherein the distance transform applied at the template comprises assigning a value of "0" to those pixels that are part of the component numeral symbol and non-numeral background pixels in the component a value related to the distance to the nearest pixel that is part of the component symbol, a low value of $s_k(m,n)$ indicates a good match between component $c_m$ and template $g_n^k$.

The quality of the match may be examined 190, and if the match is 192 sufficiently good, then an orientation match counter corresponding to the orientation under examination may be incremented 194 and the next, unexamined orientation may be considered 180. If the match is not 191 considered sufficiently good, then the next, unexamined numeral may be considered 184.

In some embodiments of the present invention, wherein a low value of $s_k(m,n)$ indicates a good match between component $c_m$ and template $g_n^k$, a template may be considered a match to a component when $s_k(m,n) \leq T_{match}$. In alternative embodiments of the present invention, wherein a low value of $s_k(m,n)$ indicates a good match between component $c_m$ and template $g_n^k$, a template may be considered a match to a component when $s_k(m,n) < T_{match}$.

In some embodiments of the present invention, wherein a large value of $s_k(m,n)$ indicates a good match between component $c_m$ and template $g_n^k$, a template may be considered a match to a component when $s_k(m,n) \geq T_{match}$. In alternative embodiments of the present invention, wherein a large value of $s_k(m,n)$ indicates a good match between component $c_m$ and template $g_n^k$, a template may be considered a match to a component when $s_k(m,n) > T_{match}$.

When there are no unexamined components remaining 196, an orientation estimate may be determined 198. In some embodiments of the present invention, the orientation corresponding to the largest-valued match counter may be selected as the orientation estimate for the document image 170.

Figure 13:
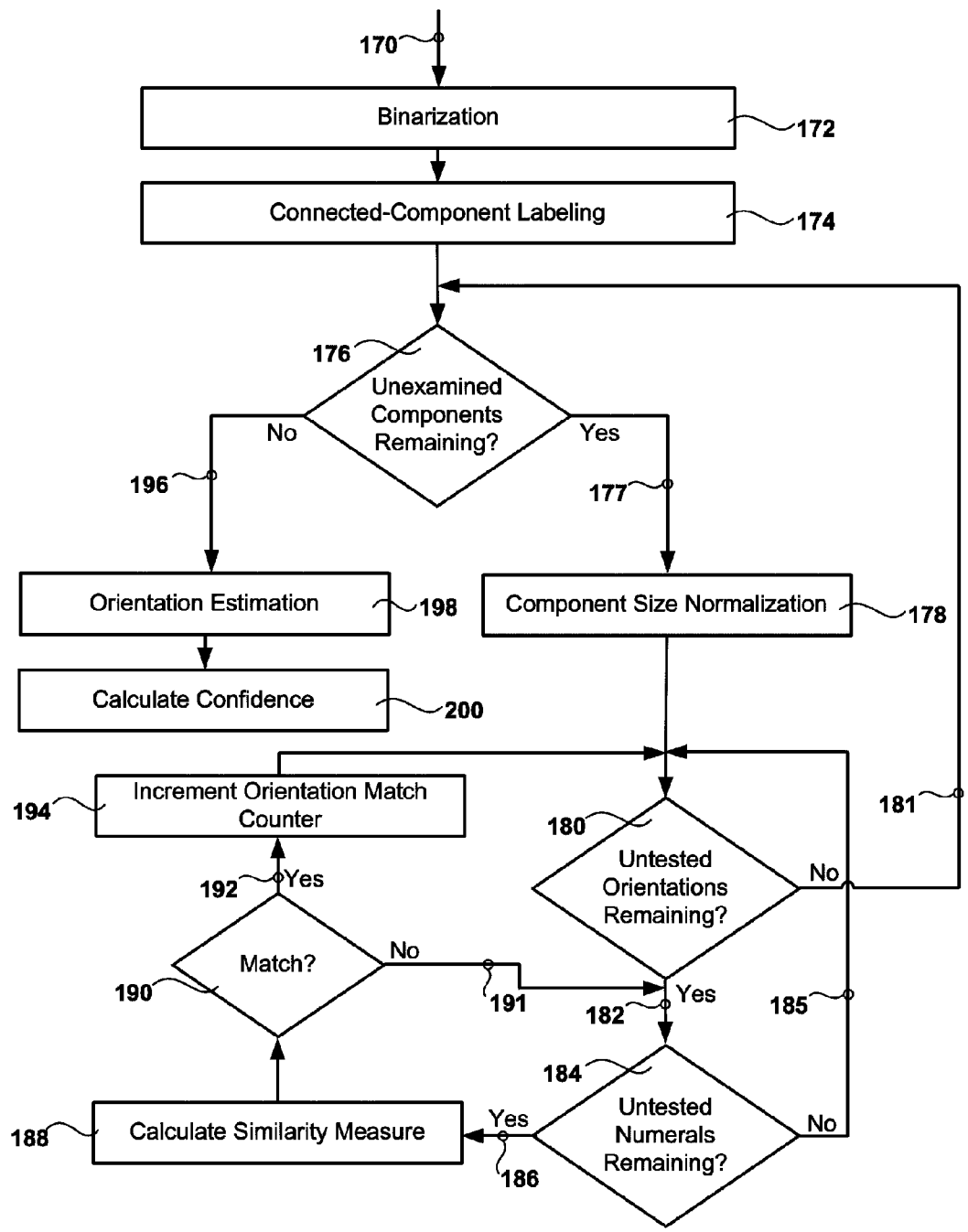
FIG. 13 is a chart showing exemplary embodiments of the present invention comprising generating a confidence value associated with an orientation estimate determined according to embodiments of the present invention shown in FIG. 12.

In some embodiments of the present invention shown in FIG. 13, after an orientation estimate is determined 198, a confidence, also considered reliability, measure related to the estimate may be determined 200.

In some embodiments of the present invention, the confidence measure may be determined 200 as previously described.

Figure 14:
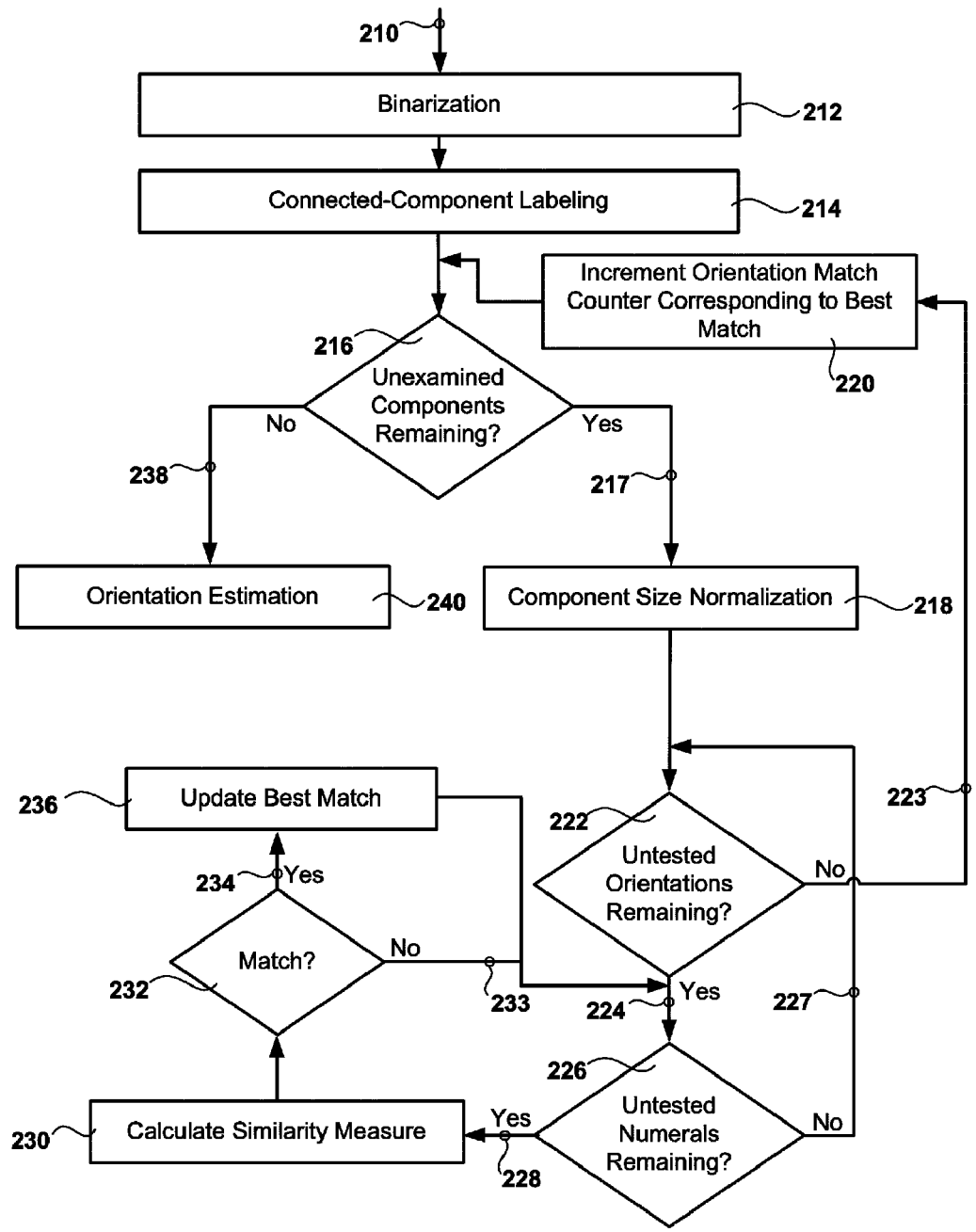
FIG. 14 is a chart showing exemplary embodiments of the present invention comprising comparing a candidate component to numeral templates at a plurality of orientations and incrementing a match counter associated with the orientation for which the best match is obtained when the best match meets a match criterion.

In some embodiments of the present invention described in relation to FIG. 12 and FIG. 13, the match counter corresponding to an orientation may be incremented when at least one template associated with the orientation is sufficiently similar to the candidate component. In alternative embodiments of the present invention, a match counter corresponding to an orientation may be incremented only when a template associated with the orientation yields the best match of all templates at all orientations. Some of these embodiments may be described in relation to FIG. 14.

In these embodiments, a document image 210 may be pre-processed prior to an orientation estimation procedure. The pre-processing may include binarization 212 of the document image 210. Connected-component labeling 214 may be performed on the binarized document image.

In some embodiments of the present invention, binarization 212 may comprise thresholding wherein image pixel values below a threshold value are assigned to one of binary values "0" or "1," and image pixels above, or equal to, the threshold value are assigned to the other binary value. In an exemplary embodiment, thresholding a document image with white background and black test may yield a binary mask image wherein all text pixels are represented with "1"s, and all non-text pixels are represented with "0"s. Individual pixels that are connected through common neighbors may be grouped into single entities in the connected component labeling 214 process. The connected components may correspond to non-background content in the document image.

Exemplary non-background content may comprise text, picture regions, line art, local background regions and other non-background content. In some embodiments of the present invention, each connected component may be represented by the minimum bounding box that contains all of the non-background pixels of the connected component. In some embodiments of the present invention, component properties may be computed to eliminate non-text connected components.

Connected-component candidates may be examined 216. If there are connected components remaining to examine 217, the next connected component may be examined. The component may be size normalized 218 forming a normalized, binary component. In some embodiments of the present invention, the binary connected component may be size normalized to a 32 pixel by 32 pixel grid.

In alternative embodiments of the present invention, normalization may be performed on all candidate connected components prior to determining if a candidate has been examined.

The normalized, binary component may be compared to numeral templates at each of the four cardinal orientations. It may first be determined 222 if all orientations have been tested. If all orientations have been tested 223, then an orientation match counter corresponding to the orientation for which the best match between the component and a template was obtained may be incremented 220. Then the next component may be examined 216.

If there are remaining orientations to test 224, it may be determined 226 if there are remaining numeral templates to be tested. If there are no remaining numeral templates to be tested at an orientation 227, then the next orientation may be examined 222. If there are remaining numeral templates to test 228, then a similarity measure may be calculated 230 between the normalized, binary component and the numeral template at the orientation under examination.

In some embodiments of the present invention, the similarity, denoted $s_k(m,n)$ between a component, $c_m$, and a template $g_n^k$, where the subscript n refers to the numeral and the superscript k refers to the orientation, may be calculated 230 according to:

$$s_k(m, n) = \sum_{i=1}^{I} \sum_{j=1}^{J} c_m(i, j) g_n^k(i, j),$$

where the normalized size of a component and a template is I pixels by J pixels. In some embodiments of the present invention, I=32 and J=32.

In these embodiments of the present invention, wherein the templates comprise distance-transformed numerals and the candidate components comprise normalized, binary components, the similarity may be calculated 230 according to:

$$s_k(m, n) = \sum_{i=1}^{I} \sum_{j=1}^{J} \begin{cases} g_n^k(i, j), & \text{if } c_m(i, j) = 1 \\ 0, & \text{otherwise} \end{cases}.$$

In some embodiments of the present invention, wherein the distance transform applied at the template comprises assigning a value of "0" to those pixels that are part of the component numeral symbol and non-numeral background pixels in the component a value related to the distance to the nearest pixel that is part of the component symbol, a low value of $s_k(m,n)$ indicates a good match between component $c_m$ and template $g_n^k$.

The quality of the match may be examined 232, and if the match is 234 sufficiently good, then a best match indicator may be updated 236 if the current match is a better match. The next, unexamined numeral may be considered 226. If the match is not 233 considered sufficiently good, then the next, unexamined numeral may be considered 226.

In some embodiments of the present invention, wherein a low value of $s_k(m,n)$ indicates a good match between component $c_m$ and template $g_n^k$, a template may be considered a match to a component when $s_k(m,n) \leq T_{match}$. In alternative embodiments of the present invention, wherein a low value of $s_k(m,n)$ indicates a good match between component $c_m$ and template $g_n^k$, a template may be considered a match to a component when $s_k(m,n) < T_{match}$.

In some embodiments of the present invention, wherein a large value of $s_k(m,n)$ indicates a good match between component $c_m$ and template $g_n^k$, a template may be considered a match to a component when $s_k(m,n) \geq T_{match}$. In alternative embodiments of the present invention, wherein a large value of $s_k(m,n)$ indicates a good match between component $c_m$ and template $g_n^k$, a template may be considered a match to a component when $s_k(m,n) > T_{match}$.

When there are no unexamined components remaining 238, an orientation estimate may be determined 240. In some embodiments of the present invention, the orientation corresponding to the largest-valued match counter may be selected as the orientation estimate for the document image 210.

In alternative embodiments of the present invention, all matches and associated orientations may be recorded upon occurrence, and the best match may be determined after all templates have been examined.

Figure 15:
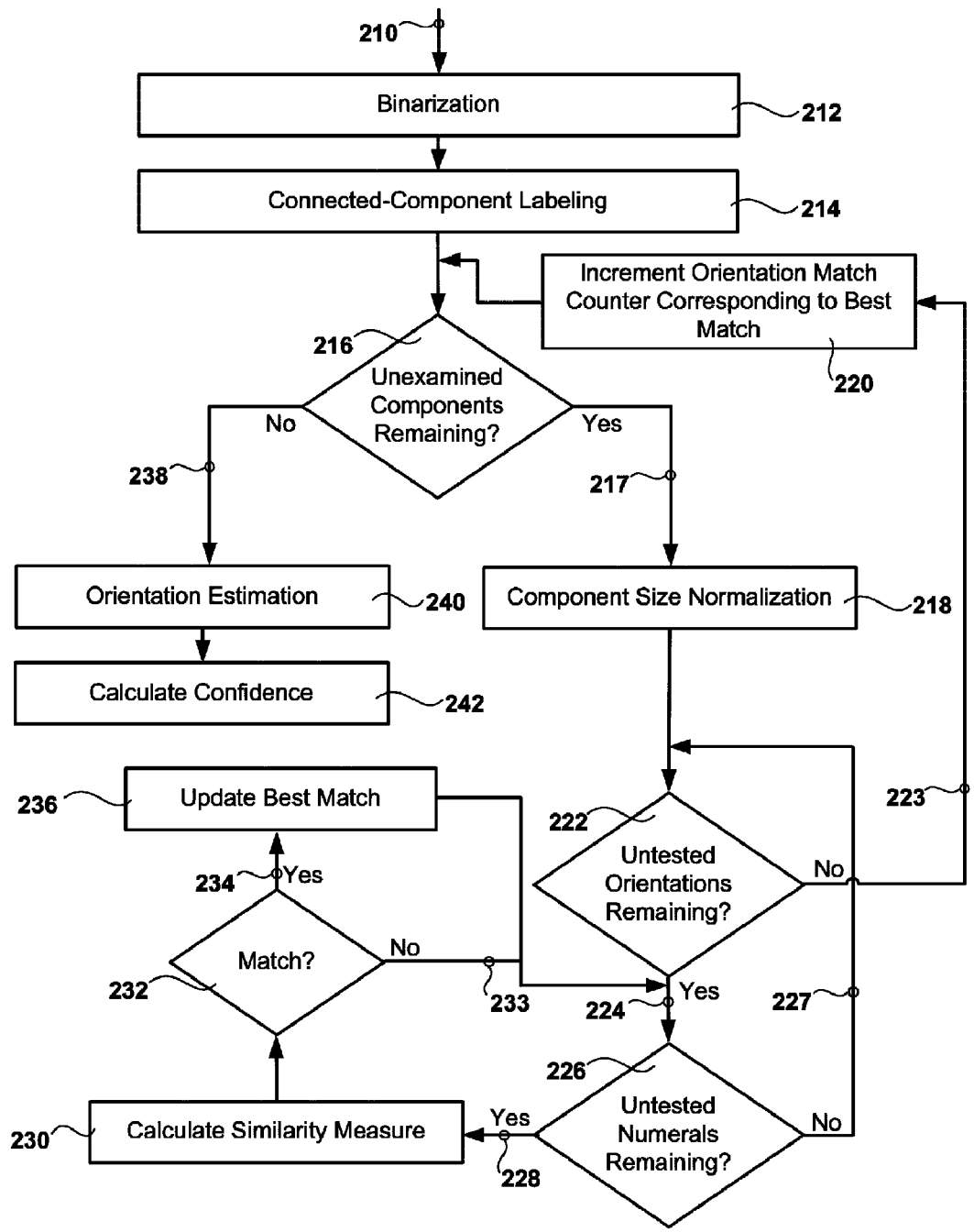
FIG. 15 is a chart showing exemplary embodiments of the present invention comprising generating a confidence value associated with an orientation estimate determined according to embodiments of the present invention shown in FIG. 14.

In some embodiments of the present invention shown in FIG. 15, after an orientation estimate is determined 240, a confidence, also considered reliability, measure related to the estimate may be determined 242.

In some embodiments of the present invention, the confidence measure may be determined 242 as previously described.

In some embodiments of the present invention, the all ten Arabic numerals may be included in the training set. In alternative embodiments of the present invention, a subset of all ten Arabic numerals may be used as the training set. In some of these embodiments, the reduced set of templates may be selected to include numerals with high orientation saliency. In one of these embodiments, the subset may contain the numerals 2, 3, 4, 5 and 7.

In some embodiments of the present invention, a subset may be determined via analysis of a plurality of test documents. In some embodiments, the analysis may be automatic. In alternative embodiments, the analysis may be performed by a human. In alternative embodiments of the present invention, the subset may be assigned heuristically by an expert.

In some embodiments of the present invention, a match counter corresponding to an orientation may be incremented by one. In alternative embodiments of the present invention, the match value registered for a numeral may be weighted by an orientation saliency. In these embodiments, the contribution to the match accumulator may be greater when the match is with a numeral with strong orientation-specific features. In some embodiments, the saliency weights may be determined by an automated process via analysis over a set of test documents. In alternative embodiments, the saliency weights may be assigned according to a heuristic developed by an expert.

Figure 16:
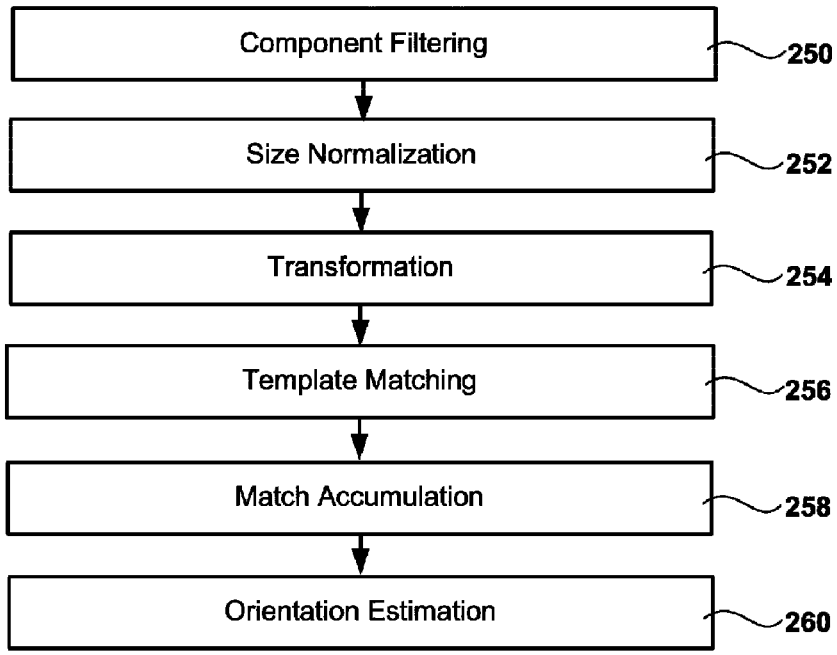
FIG. 16 is a chart showing exemplary embodiments of the present invention comprising document-orientation determination, wherein candidate components are binarized and normalized for size before comparison to numeral templates.

Some embodiments of the present invention may be described in relation to FIG. 16. In these embodiments, document components may be filtered 250 to generate component candidates. In these embodiments, component candidates may be size normalized 252, transformed 254 and matched 256 against reference templates. In some embodiments of the present invention, document components may comprise binary, connected components, and the component filtering 250 may determine likely numeric components from the document components. Matches may be accumulated 258, and an orientation estimate may be generated 260 based on the accumulated matches.

Figure 17:
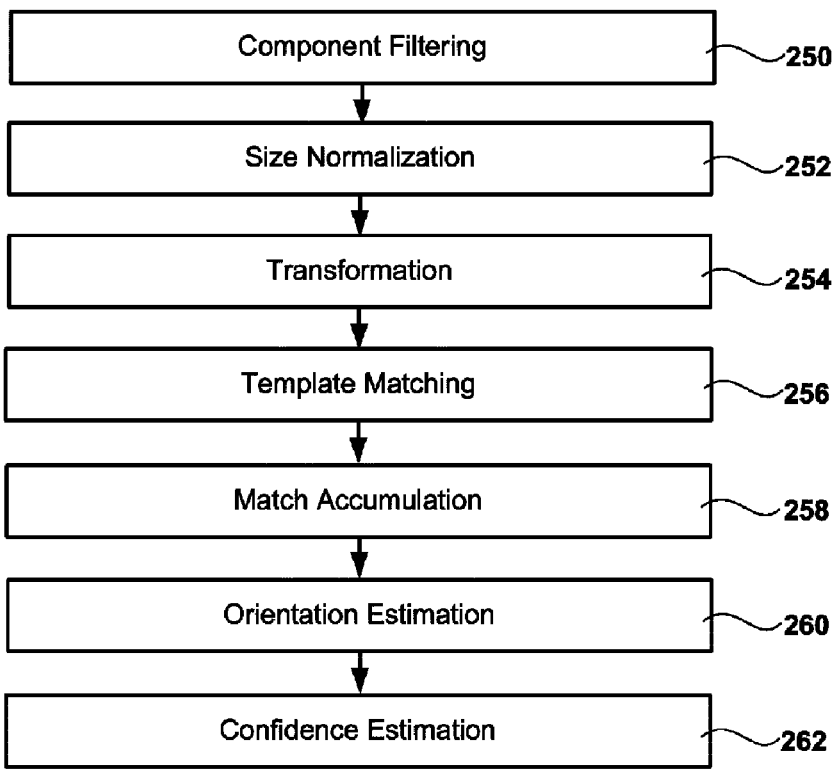
FIG. 17 is a chart showing exemplary embodiments of the present invention comprising determining a confidence value associated with an orientation estimate.

Some embodiments of the present invention may be described in relation to FIG. 17. In these embodiments, document components may be filtered 250 to generate component candidates. In these embodiments, component candidates may be size normalized 252, transformed 254 and matched 256 against reference templates. In some embodiments of the present invention, document components may comprise binary, connected components, and the component filtering 250 may determine likely numeric components from the document components. Matches may be accumulated 258, and an orientation estimate may be generated 260 based on the accumulated matches. In these embodiments, a confidence value indicating the validity of the orientation estimate may be determined 262. In these embodiments of the present invention, the reference templates may comprise orientation-specific numeral templates.

Some embodiments of the present invention may comprise methods and systems for locating numeric characters in a document image. These methods and systems may be used to effectuate the component filtering. In these embodiments, a binary text map may be produced from an input image of an electronic document. Individual text characters may be represented as contiguous sets of pixels in the binary text map.

Figure 18A:
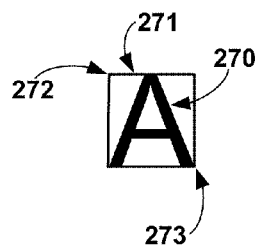
FIG. 18A is a picture showing an exemplary text character and text-character bounding box.

In some embodiments of the present invention, individual text characters in a digital document image may be grouped into text lines, also considered sequences of characters. An individual text character 270, as shown in FIG. 18A, may be described by an associated bounding box 271. In some embodiments of the present invention, a text-character bounding box 271 may be a box by which the associated text character 270 is substantially circumscribed. In alternative embodiments of the present invention, the text-character bounding box 271 may be a box in which the associated text character 270 is wholly contained. The bounding box 271 may be characterized by the coordinates of two opposite corners, for example the top-left corner 272, denoted $(x_1, y_1)$, and the bottom-right corner 273, denoted $(x_2, y_2)$, of the bounding box 271, a first corner, for example the top-left corner 272, denoted $(x_1, y_1)$, and the extent of the bounding box in two orthogonal directions from the first corner, denoted dx, dy, or any other method of describing the size and location of the bounding box 271 in the digital document image.

Figure 18B:
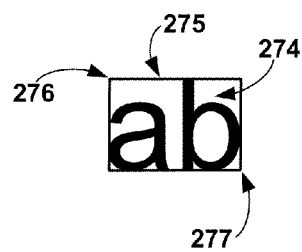
FIG. 18B is a picture showing an exemplary text object and text-object bounding box.

A text object, which may comprise one or more text characters, may be described by a text-object bounding box. FIG. 18B depicts an exemplary text object 274 and text-object bounding box 275. In some embodiments of the present invention, a text-object bounding box 275 may be a box by which the associated text object 274 is substantially circumscribed. In alternative embodiments of the present invention, the text-object bounding box 275 may be a box in which the associated text object 274 is wholly contained. The bounding box 275 may be characterized by the coordinates of two opposite corners, for example the top-left corner 276, denoted $(x_1, y_1)$, and the bottom-right corner 277, denoted $(x_2, y_2)$, of the bounding box 275, a first corner, for example the top-left corner 276, denoted ($x_1$, $y_1$), and the extent of the bounding box in two orthogonal directions from the first corner, denoted dx, dy, or any other method of describing the size and location of the bounding box 275 in the digital document image.

Figure 19:
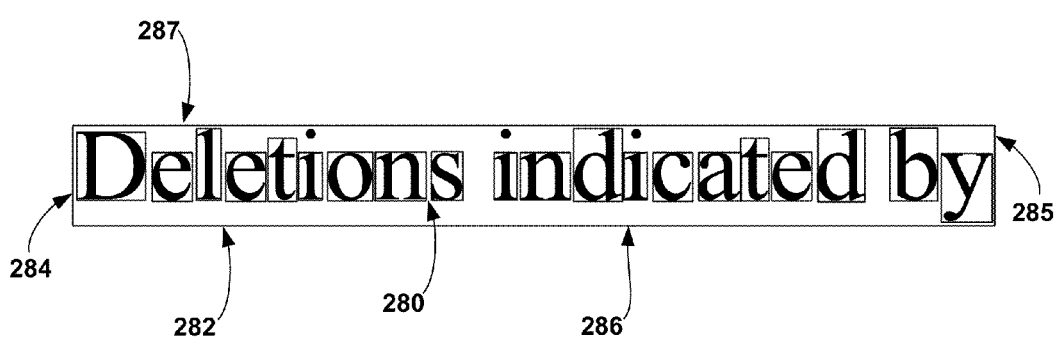
FIG. 19 is a picture showing an exemplary text line and text-line bounding box.

A text line 280, as shown in FIG. 19, may be described by an associated text-line bounding box 282. In some embodiments of the present invention, the text-line bounding box 282 may be a box by which the associated text line 280 is substantially circumscribed. In alternative embodiments of the present invention, the text-line bounding box 282 may be a box in which the associated text line 280 is wholly contained. The text-line bounding box 282 may be described by the x-coordinate of the left edge 284, denoted $x_L$, the x-coordinate of the right edge 285, denoted $x_R$, the y-coordinate of the bottom edge 286, denoted $y_B$ and the y-coordinate of the top edge 287, denoted $y_T$, or any other method of describing the size and location of the text-line bounding box 282 in the digital document image.

In some embodiments of the present invention, a text-line bounding box 282 may be determined from the bounding boxes of the constituent text characters, or text objects, within the text-line 280 according to:

$$y_T = \min\{y_1(i)\}, i=1,\ldots,N,$$

$$y_B = \max\{y_2(i)\}, i=1,\ldots,N,$$

$$x_L = \min\{x_1(i)\}, i=1,\ldots,N \text{ and}$$

$$x_R = \max\{x_2(i)\}, i=1,\ldots,N,$$

where N is the number of text characters, or text objects, in the text line, $y_1(i)$ and $y_2(i)$ are the $y_1$ and $y_2$ coordinate values of the ith text-character, or text-object, bounding box, respectively, and $x_1(i)$ and $x_2(i)$ are the $x_1$ and $x_2$ coordinate values of the ith text-character, or text-object, bounding box, respectively.

Figure 20A:
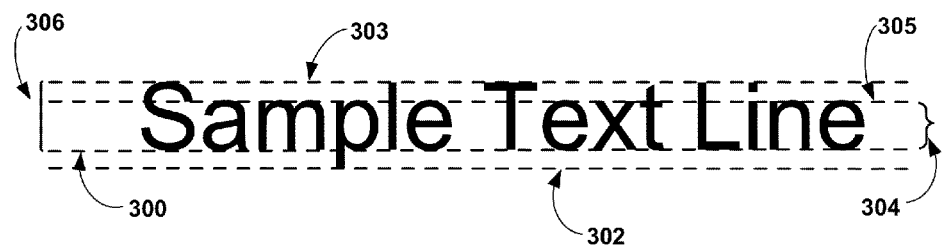
FIG. 20A is a picture showing an exemplary text line consisting of uppercase and lowercase characters.
Figure 20B:
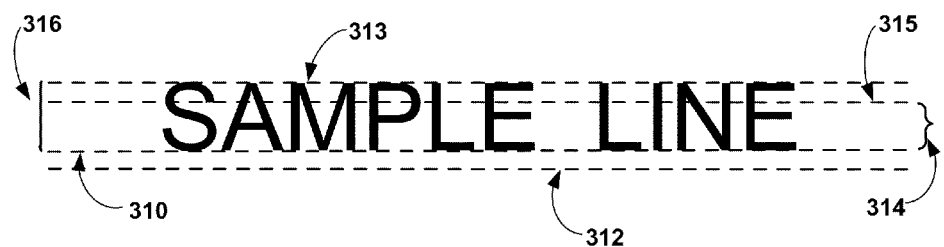
FIG. 20B is a picture showing an exemplary text line consisting of uppercase characters only.
Figure 20C:
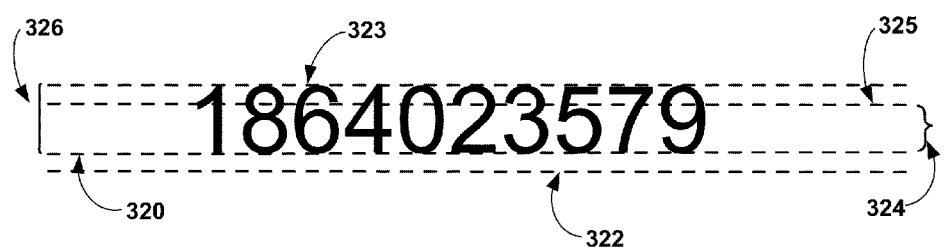
FIG. 20C is a picture showing an exemplary text line consisting of numerals only.

Typographical-related terms, described in relation to FIG. 20A, FIG. 20B and FIG. 20C may be used in the following descriptions of embodiments of the present invention. This terminology may relate to the written text characters, also considered letters and symbols, of written languages, including, but not limited to, those languages that use the Latin, Greek, Cyrillic, Devanāgarī and other alphabets. FIG. 20A shows a line of Latin alphabet text containing both uppercase letters and lowercase letters. FIG. 20B shows a line of Latin alphabet text containing only uppercase letters, and FIG. 20C shows a line of Arabic numerals.

The term baseline may refer to the line 300, 310, 320 on which text characters sit. For Latin-alphabet text, this is the line on which all capital letters and most lowercase letters are positioned. A descender may be the portion of a letter, or text character, that extends below the baseline 300, 310, 320. Lowercase letters in the Latin alphabet with descenders are "g," "j," "p," "q" and "y." The descender line may refer to the line 302, 312, 322 to which a text character's descender extends. The portion of a character that rises above the main body of the character may be referred to as the ascender. Lowercase letters in the Latin alphabet with ascenders are "b," "d," "f," "h," "k," "l" and "t." Uppercase letters in the Latin alphabet may be considered ascenders. The ascender line may refer to the line 303, 313, 323 to which a text character's ascender extends. The height 304, 314, 324 of lowercase letters in the Latin alphabet, such as "x," which do not have ascenders or descenders may be referred to as the x-height. The line 305, 315, 325 marking the top of those characters having no ascenders or descenders may be referred to as the x line. The height 306, 316, 326 of an uppercase letter may be referred to as the cap-height.

Strings of numerals possess properties that may be exploited to reduce the number of candidate components and that may be exploited to detect numeral strings. Unlike lowercase letters, there is minimal variability along the top and bottom edges of numeral-string components. For numeral and all uppercase strings, the top and bottom edges in the string bounding box may be closely aligned with the baseline 300, 310, 320 and ascender line 303, 313, 323. This may be seen in FIG. 20B and FIG. 20C. In a typical text line comprising both upper- and lowercase characters, the distance between the tops and the bottoms of the characters and the text-line boundaries may fluctuate due to the presence of ascenders and descenders together with standard-size text and uppercase symbols.

In some embodiments of the present invention, the amount of variation across the top and bottom bounds of a reconstructed symbol string may be quantified.

For a line of text, denoted t, oriented horizontally in the digital document image, a ceiling value, denoted ceil(t), and a floor value, denoted floor(t), may be calculated according to:

$$\text{ceil}(t) = \frac{1}{N} \sum_{i=1}^{N} y_1(i) \text{ and } \text{floor}(t) = \frac{1}{N} \sum_{i=1}^{N} y_2(i),$$

where N is the number of text characters in text line t, and $y_1(i)$ and $y_2(i)$ are the $y_1$ and $y_2$ coordinate values of the ith text character bounding box, respectively. The ceiling value may be considered a sample mean of the $y_1$ coordinate values of the character bounding boxes, and the floor value may be considered a sample mean of the $y_2$ coordinate values of the character bounding boxes.

For a line of text, denoted t, oriented vertically in the digital document image, a ceiling value, denoted ceil(t), and a floor value, denoted floor(t), may be calculated according to:

$$\text{ceil}(t) = \frac{1}{N} \sum_{i=1}^{N} x_1(i) \text{ and } \text{floor}(t) = \frac{1}{N} \sum_{i=1}^{N} x_2(i),$$

where N is the number of text characters in text line t, and $x_1(i)$ and $x_2(i)$ are the $x_1$ and $x_2$ coordinate values of the ith text character bounding box, respectively. The ceiling value may be considered a sample mean of the $x_1$ coordinate values of the character bounding boxes, and the floor value may be considered a sample mean of the $x_2$ coordinate values of the character bounding boxes.

The error between the samples and the corresponding sample mean may be an indicator of where the text baseline is located. Top and bottom error measures may be calculated and may be used as top- and bottom-alignment features.

For a line of text, denoted t, oriented horizontally in the digital document image, exemplary error measure may comprise:

Mean Absolute Error (MAE) calculated according to:

$$e_{MAE}^{top}(t) = \frac{1}{N}\sum_{i=1}^{N}|y_1(i) - \text{ceil}(t)|, \ e_{MAE}^{bottom}(t) = \frac{1}{N}\sum_{i=1}^{N}|y_2(i) - \text{floor}(t)|;$$

Mean-Square Error (MSE) calculated according to:

$$e_{MSE}^{top}(t) = \frac{1}{N}\sum_{i=1}^{N}(y_1(i) - \text{ceil}(t))^2,$$

$$e_{MSE}^{bottom}(t) = \frac{1}{N}\sum_{i=1}^{N}(y_2(i) - \text{floor}(t))^2;$$

Root Mean-Square Error (RMSE) calculated according to:

$e_{RMSE}^{top}(t) = \sqrt{e_{MSE}^{top}(t)}$, $e_{RMSE}^{bottom}(t) = \sqrt{e_{MSE}^{bottom}(t)}$; and other error measures.

For a line of text, denoted t, oriented vertically in the digital document image, exemplary error measure may comprise:

Mean Absolute Error (MAE) calculated according to:

$$e_{MAE}^{top}(t) = \frac{1}{N}\sum_{i=1}^{N}|x_1(i) - \text{ceil}(t)|, \quad e_{MAE}^{bottom}(t) = \frac{1}{N}\sum_{i=1}^{N}|x_2(i) - \text{floor}(t)|;$$

Mean-Square Error (MSE) calculated according to:

$$e_{MSE}^{top}(t) = \frac{1}{n}\sum_{i=1}^{N}(x_1(i) - \text{ceil}(t))^2,$$

$$e_{MSE}^{bottom}(t) = \frac{1}{N}\sum_{i=1}^{N}(x_2(i) - \text{floor}(t))^2;$$

Root Mean-Square Error (RMSE) calculated according to:

$e_{RMSE}^{top}(t) = \sqrt{e_{MSE}^{top}(t)}$, $e_{RMSE}^{top}(t) = \sqrt{e_{MSE}^{bottom}(t)}$; and other error measures.

Figure 21:
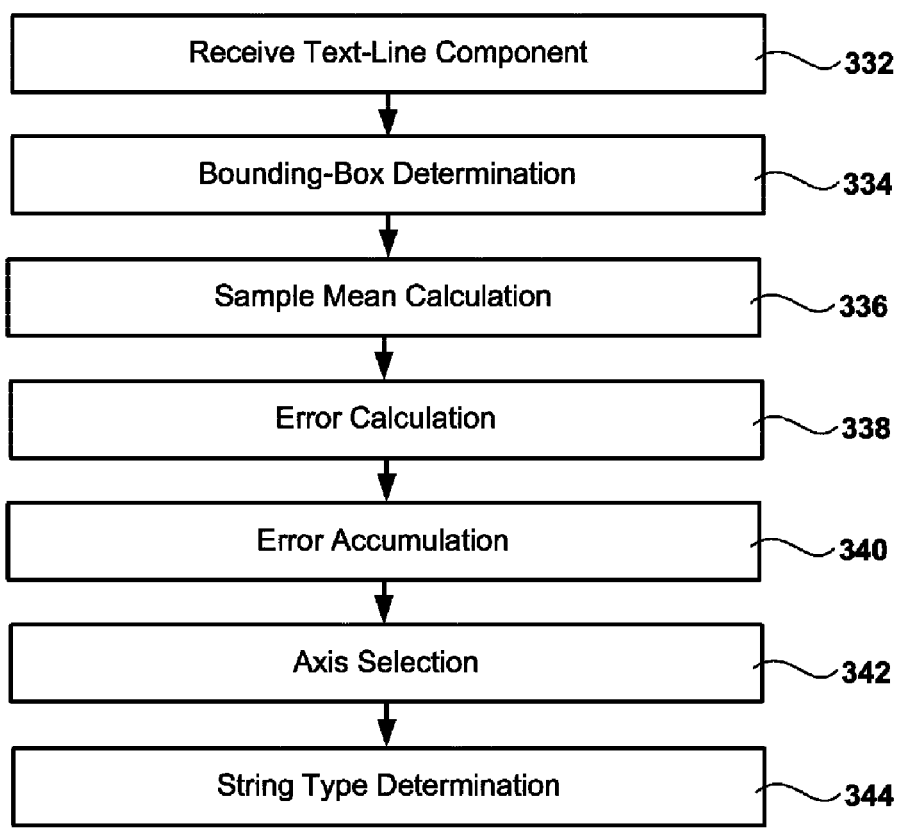
FIG. 21 is a chart showing embodiments of the present invention comprising numeral-line identification based on character bound variability in relation to sample means related to the character bounds.

For numeral strings, the error measures may be expected to be small. Some embodiments of the present invention described in relation to FIG. 21 may use this fact to eliminate mixed upper- and lowercase text candidates. In these embodiments, a text-line component comprising character connected components may be received 332.

In some embodiments of the present invention, each connected component may be represented 334 by the minimum bounding box that contains all of the non-background pixels of the connected component.

Since the orientation of the page and, consequently, the text lines, are unknown, it may not be known which edge pair of the bounding box must be used in the error measure. Therefore in these embodiments, the sample means may be calculated 336 for both the x- and y-coordinate pairs according to:

$$\mu_y^{(1)} = \frac{1}{N}\sum_{i=1}^{N}y_1(i), \quad \mu_y^{(2)} = \frac{1}{N}\sum_{i=1}^{N}y_2(i)$$

and $$\mu_x^{(1)} = \frac{1}{N}\sum_{i=1}^{N}x_1(i), \quad \mu_x^{(3)} = \frac{1}{N}\sum_{i=1}^{N}x_2(i),$$

where N is the number of components in the text line.

The error may be calculated 338 along each edge using bounding-box edge coordinates and the corresponding sample mean. The cumulative error along each axis may be calculated 340 as the sum of the two error values for that axis according to:

$$Error_{horizontal} = \frac{1}{N}\left(\sum_{i=1}^{N}|y_1(i) - \text{ceil}(t)| + \sum_{i=1}^{N}|y_2(i) - \text{floor}(t)|\right)$$
$$= e^{top} + e^{bottom}$$

and $$Error_{vertical} = \frac{1}{N}\left(\sum_{i=1}^{N}|x_1(i) - \text{ceil}(t)| + \sum_{i=1}^{N}|x_2(i) - \text{floor}(t)|\right)$$
$$= e^{top} + e^{bottom}$$

when the mean absolute error is used;

$$Error_{horizontal} = \frac{1}{N}\left(\sum_{i=1}^{N}(y_1(i) - \text{ceil}(t))^2 + \sum_{i=1}^{N}(y_2(i) - \text{floor}(t))^2\right)$$
$$= e^{top} + e^{bottom}$$

and $$Error_{vertical} = \frac{1}{N}\left(\sum_{i=1}^{N}(x_1(i) - \text{ceil}(t))^2 + \sum_{i=1}^{N}(x_2(i) - \text{floor}(t))^2\right)$$
$$= e^{top} + e^{bottom}$$

when the mean-square error is used; and $$Error_{horizontal} = \sqrt{\frac{1}{N}\sum_{i=1}^{N}(y_1(i) - \text{ceil}(t))^2} + \sqrt{\frac{1}{N}\sum_{i=1}^{N}(y_2(i) - \text{floor}(t))^2}$$
$$= e^{top} + e^{bottom}$$

and $$Error_{vertical} = \sqrt{\frac{1}{N}\sum_{i=1}^{N}(x_1(i) - \text{ceil}(t))^2} + \sqrt{\frac{1}{N}\sum_{i=1}^{N}(x_2(i) - \text{floor}(t))^2}$$
$$= e^{top} + e^{bottom}$$

when the root mean-square error is used.

In some embodiments of the present invention, the error values associated with the axis, horizontal or vertical, that registers that minimum cumulative error may be selected 342 to use in the determination 344 of string type.

The string type may be estimated 344 based on error values related to the minimum cumulative error. In some embodiments of the present invention, the string type may be determined 344 to be numeral/all uppercase if both $e^{top}$ and $e^{bottom}$ are below a predefined threshold value which may be denoted $T_v$. If this condition is not met, then the string type may be determined 344 to be mixed upper- and lowercase characters.

In some embodiments of the present invention, the mean absolute error measure is used to measure the variation in a text line, and the threshold value $T_v=1.5$ may be used.

In some embodiments of the present invention, further analysis of a text line may be performed to eliminate text lines consisting of all uppercase characters. In some of these embodiments, a constraint on the aspect ratio of the individual components in the text line may be used to discriminate all-uppercase text lines from numeric text lines.

In these embodiments, the aspect ratio, $AR_t(i)$, for each component i in text line t, may be calculated according to:

$$AR_t(i) = \frac{\max(|x_2^{(i)} - x_1^{(i)}|, |y_2^{(i)} - y_1^{(i)}|)}{\min(|x_2^{(i)} - x_1^{(i)}|, |y_2^{(i)} - y_1^{(i)}|)}.$$

The mean, $\mu_{AR}$, and the variance, $\sigma_{AR}^2$, of the aspects ratios of the components may be calculated. In some embodiments of the present invention, the text line may be labeled a numeric line when $\mu_{AR} > T_{AR}$, and $\sigma_{AR}^2 < T_{ARo}$ and a non-numeric line otherwise. $T_{AR\mu}$ and $T_{ARo}$ are threshold values which may be determined in a variety of ways, for example, by analysis of training data, according to a heuristic developed by an expert and other methods.

In some embodiments of the present invention, a limit on the number of components in a text line may be used to determine if a text line is a numeric text line. In these embodiments, a line may be discarded from further consideration when the number, N, of components in a text line exceeds a threshold, $T_{length}$. In some embodiments of the present invention, $T_{length}=24$.

In some embodiments of the present invention a text line and its components may be labeled as numeric if all of the following conditions are satisfied:
1. $e^{top} \leq T_v$ and $e^{bottom} \leq T_v$; and
2. $\mu_{AR} > T_{AR\mu}$; and
3. $\sigma_{AR}^2 < T_{ARo}$; and
4. $N < T_{length}$.

In some embodiments of the present invention, all conditions may be tested on a text line. In alternative embodiments of the present invention, the conditions may be tested progressively, wherein the next condition may only be tested when the current condition is met.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for determining the orientation of an image, said method comprising:
   comparing a first connected-component object from an image to a first plurality of numeral templates, wherein said first plurality of numeral templates corresponds to a first orientation;
   incrementing a first match counter, wherein said first match counter is associated with said first orientation, when said comparing a first connected-component object to a first plurality of numeral templates indicates a match between said first connected-component object and at least one numeral template of said first plurality of numeral templates;
   comparing said first connected-component object to a second plurality of numeral templates, wherein said second plurality of numeral templates corresponds to a second orientation;
   incrementing a second match counter, wherein said second match counter is associated with said second orientation, when said comparing said first connected-component object to a second plurality of numeral templates indicates a match between said first connected-component object and at least one numeral template of said second plurality of numeral templates; and
   selecting an image orientation for said image based on said first match counter and said second match counter.

2. A method as described in claim 1 further comprising determining a reliability measure associated with said image orientation.

3. A method as described in claim 2 further comprising:
   accepting said image orientation when said reliability measure meets a first condition; and
   rejecting said image orientation when said reliability measure does not meet said first condition.

4. A method as described in claim 1, wherein said comparing a first connected-component object from an image to a first plurality of numeral templates comprises calculating a similarity measure between said first connected-component object and a first numeral template from said first plurality of numeral templates.

5. A method as described in claim 1 further comprising:
   detecting a first connected component in said image, thereby producing a first binary connected component; and
   normalizing said first binary connected component for size, thereby producing said first connected-component object.

6. A method as described in claim 1 further comprising:
   detecting a first connected component in said image, thereby producing a first binary connected component;
   normalizing said first binary connected component for size, thereby producing a first normalized, binary connected component; and
   processing said first normalized, binary connected component according to a distance transform, thereby producing said first connected-component object.

7. A method as described in claim 6, wherein said distance transform comprises a grassfire transform.

8. A method as described in claim 1, wherein said selecting an image orientation for said image based on said first match counter and said second match counter comprises:
   selecting said first orientation when the value of said first match counter is greater than the value said second match counter; and
   selecting said second orientation when the value of said first match counter is not greater than the value of said second match counter.

9. A method as described in claim 1 further comprising:
   comparing said first connected-component object to a third plurality of numeral templates, wherein said third plurality of numeral templates corresponds to a third orientation;
   incrementing a third match counter, wherein said third match counter is associated with said third orientation, when said comparing said first connected-component object to a third plurality of numeral templates indicates a match between said first connected-component object and at least one numeral template of said third plurality of numeral templates;
   comparing said first connected-component object to a fourth plurality of numeral templates, wherein said third plurality of numeral templates corresponds to a fourth orientation;
   incrementing a fourth match counter, wherein said fourth match counter is associated with said fourth orientation, when said comparing said first connected-component object to a fourth plurality of numeral templates indicates a match between said first connected-component object and at least one numeral template of said fourth plurality of numeral templates; and selecting an image orientation for said image based on said first match counter, said second match counter, said third match counter and said fourth match counter.

10. A method as described in claim 9, wherein:

said second orientation is related to said first orientation by a 90° clockwise rotation;

said third orientation is related to said first orientation by a 180° clockwise rotation; and said fourth orientation is related to said first orientation by a 270° clockwise rotation.

11. A method as described in claim 9, wherein said selecting an image orientation for said image based on said first match counter, said second match counter, said third match counter and said fourth match counter comprises:

selecting said first orientation when said first match counter is greater than said second match counter, said third match counter and said fourth match counter;

selecting said second orientation when said second match counter is greater than said first match counter, said third match counter and said fourth match counter;

selecting said third orientation when said third match counter is greater than said first match counter, said second match counter and said fourth match counter; and selecting said fourth orientation when said fourth match counter is greater than said first match counter, said second match counter and said third match counter.

12. A method as described in claim 1 further comprising:

detecting a first connected component in said image, thereby producing a first binary connected component;

determining if said first binary connected component is a numeral component; and when said first binary connected component is determined to be a numeral component:

normalizing said first binary connected component for size, thereby producing a first normalized, binary connected component; and processing said first normalized, binary connected component according to a distance transform, thereby producing said first connected-component object.

13. A method as described in claim 1 further comprising:

comparing a second connected-component object from an image to said first plurality of numeral templates;

incrementing said first match counter when said comparing a second connected-component object to said first plurality of numeral templates indicates a match between said second connected-component object and at least one numeral template of said first plurality of numeral templates;

comparing said second connected-component object to said second plurality of numeral templates; and incrementing said second match counter when said comparing said second connected-component object to said second plurality of numeral templates indicates a match between said connected-component object and at least one numeral template of said second plurality of numeral templates.

\* \* \* \* \*

UNITED STATES PATENT AND TRADEMARK OFFICE
CERTIFICATE OF CORRECTION

PATENT NO. : 8,229,248 B2
APPLICATION NO. : 13/221844
DATED : July 24, 2012
INVENTOR(S) : Ahmet Mufit Ferman et al.

Page 1 of 1

It is certified that error appears in the above-identified patent and that said Letters Patent is hereby corrected as shown below:

Column 19, Line 36 should read:

$$e_{RMSE}^{top}(t) = \sqrt{e_{MSE}^{top}(t)}, \; e_{RMSE}^{bottom}(t) = \sqrt{e_{MSE}^{bottom}(t)};$$

Signed and Sealed this
Twenty-ninth Day of January, 2013

David J. Kappos
*Director of the United States Patent and Trademark Office*